US008768804B2

(12) United States Patent  
Holten et al.

(10) Patent No.: US 8,768,804 B2
(45) Date of Patent: Jul. 1, 2014

(54) DATA ANALYSIS SYSTEM

(75) Inventors: Danny Hubertus Rosalia Holten, Kerkrade (NL); Johannes Cornelius Adrianus Buenen, S-Hertogenbosch (NL)

(73) Assignee: SynerScope B.V. (NL)

( * ) Notice: Subject to any disclaimer, the term of this patent is extended or adjusted under 35 U.S.C. 154(b) by 131 days.

(21) Appl. No.: 13/102,648

(22) Filed: May 6, 2011

(65) Prior Publication Data

US 2012/0284155 A1 Nov. 8, 2012

(51) Int. Cl.
*G06Q 40/00* (2012.01)
(52) U.S. Cl.
USPC .............................................. 705/35; 505/39
(58) Field of Classification Search
USPC ....................................................... 705/10–55
See application file for complete search history.

(56) References Cited

U.S. PATENT DOCUMENTS

| | | | |
|---|---|---|---|
| 6,862,686 B1 * | 3/2005 | Bahrs et al. ..................... 726/3 |
| 6,934,858 B2 * | 8/2005 | Woodhill ......................... 726/5 |
| 7,024,419 B1 | 4/2006 | Klenk et al. | |
| 7,124,302 B2 * | 10/2006 | Ginter et al. .................. 713/189 |
| 7,401,057 B2 * | 7/2008 | Eder .............................. 706/20 |
| 7,415,671 B2 * | 8/2008 | Sylor et al. .................... 715/736 |
| 7,606,168 B2 | 10/2009 | Robinson et al. | |
| 7,617,185 B2 | 11/2009 | Werner et al. | |
| 7,777,743 B2 | 8/2010 | Pao et al. | |
| 7,809,659 B1 * | 10/2010 | Paiz ................................. 706/20 |
| 7,849,408 B1 | 12/2010 | Messinger et al. | |
| 2002/0186238 A1 * | 12/2002 | Sylor et al. .................... 345/736 |
| 2005/0080655 A1 | 4/2005 | Sengir et al. | |
| 2005/0192926 A1 | 9/2005 | Liu et al. | |
| 2007/0005967 A1 * | 1/2007 | Mister et al. .................. 713/168 |
| 2007/0171716 A1 | 7/2007 | Wright et al. | |
| 2008/0203170 A1 * | 8/2008 | Hammad et al. .............. 235/492 |
| 2009/0125543 A1 * | 5/2009 | Patil et al. ...................... 707/102 |
| 2009/0313041 A1 * | 12/2009 | Eder ................................. 705/2 |
| 2010/0077352 A1 | 3/2010 | Heer et al. | |
| 2011/0055074 A1 | 3/2011 | Chen et al. | |
| 2012/0041790 A1 * | 2/2012 | Koziol .............................. 705/4 |

OTHER PUBLICATIONS

Wikipedia: "Framebuffer", Internet article, Jan. 31, 2011.

(Continued)

*Primary Examiner* — Frantzy Poinvil
(74) *Attorney, Agent, or Firm* — Monument IP Law Group

(57) ABSTRACT

A data analysis system (1) for displaying data facilitating visual analysis of financial transaction is disclosed. The system includes a transactions database (3) operable to store transaction records (5) defining financial transactions and a processing module (11) operable to determine a hierarchy having a tree structure wherein leaf nodes in the lowest level of the hierarchy correspond to sources and destinations associated with financial transactions represented by transaction records 5) stored in the transactions database (5). The processing module (11) then causes representations of the financial transactions to be displayed on a display screen (13) by determining for each transaction a first set of control co-ordinates comprising co-ordinates associated with elements in a path in the tree structure connecting the source and destination associated with a financial transaction via the closest common parent in the hierarchy common to the source and destination; determining for each transaction a second set of control co-ordinates for drawing a straight line between co-ordinates associated with the source and destination associated with the financial transaction; calculating as a set of control co-ordinates for representing a transaction weighted averages of corresponding co-ordinates in the first and second set, weighted by a bundling factor; and representing each of the financial transactions as a line drawn utilizing the calculated control co-ordinates for each transaction.

15 Claims, 17 Drawing Sheets

(56) References Cited

OTHER PUBLICATIONS

Holten, et al., "Trace visualization using hierarchical edge bundles and massive sequence views", Visualizing Software for Understanding and Analysis, 4th IEEE International Workshop, pp. 47-54, Jun. 2007.

Draper, et al., "A survey of radial methods for information visualization", IEEE Transactions on Visualization and Computer Graphics, IEEE Service Center, Sep. 1, 2009.

Danny Holten, "Hierarchical Edge Bundles: Visualization of Adjaceny Relations in Hierarchical Data", IEEE Transactions on Visualization and Computer Graphics, vol. 12, No. 5, Sep./Oct. 2006.

Danny Holten, "A User Study on Visualizing Directed Edges in Graphs", CHI 2009, Apr. 4-9, 2009, Boston, MA pp. 1-10.

Danny Holten, "Visualization of Graphs and Trees for Software Analysis", May 20, 2009, 163 pages.

* cited by examiner

Fig. 6

DATA ANALYSIS SYSTEM

FIELD

The present application concerns a data analysis system.

More specifically embodiments of the present application concerns methods and apparatus for processing data to identify deviations or anomalies from normal or expected patterns of transactions. Such transactions may include financial, accounting, insurance, security trading, security access and phone or computer mediated transactions. Such deviation may arise due to system, process and method design mistakes or erroneous data entries which require identification and correction.

A special type of deviations or anomalies in transactions and transaction patterns are those introduced on purpose by individuals or co-operating or co-ordinated groups of individuals, who try to gain a financial advantage, such activities being categorized as fraud and/or financial crime.

BACKGROUND

Credit card fraud is one example of fraud. Credit card fraud poses significant risk and financial exposure not only to the issuing financial institution but also to the victimized merchants. In addition to financial exposure, the reputation and trust of the issuing card brand and bank can be adversely impacted. Such fraud also can cause significant inconvenience and distress for those individuals whose financial information is compromised.

Many financial transactions are e-commerce or Point of Sale (POS) transactions which are transmitted electronically. Although this is of benefit to consumers this also enables stolen credit card information to be processed by organized and technically proficient criminals in large quantities as a compromised e-commerce site or POS can allow a credit card fraud ring to electronically intercept thousands of the credit card numbers, security codes and card holder identities.

In a typical organized credit card information theft event, a criminal organization or individual through the use of malware or network intrusion will compromise the client (customer), retailer (seller) or financial institution to gain as many individual credit card identities as possible. These criminal organizations will then either sell the information or use it themselves to conduct as many transactions as possible with the information they have acquired across all the different accounts until the financial institution detects the activity and blocks the accounts.

As we have moved to an ecommerce online driven retail system, the front line defense of the fraudster actually having to produce a card and conduct the transaction in person is now removed. Credit card rings can conduct all their activities online where the only validation methods present is the information that was compromised: account number, security code and the personal information of the account holder.

Armed with this information, an organized credit card fraud ring can conduct thousands of transactions in a very short period of time before the financial institution or the credit card holder becomes aware of the activity. Because of the speed at which the information can be stolen and used, exposure to the retailer and the financial institution is calculated in minutes not days. Rapid detection is vital as the earlier a pattern the detected the less the exposure.

Traditionally, credit card issuers' primary defense against credit card fraud has been through "fraud modeling" where typical fraudulent behavior is analyzed and encapsulated in a series of algorithms which the fraud model utilizes to judge the risk of the transaction being presented in the flow. This method is relied on due the rapidly increasing numbers transactions as society has gravitated toward electronic payment and away from cash or check transactions even for relatively small purchases.

Fraud models however do not learn fraud trends. Rather the systems must be taught the patterns which are indicative of fraud. As credit card fraud rings become increasingly technically proficient they also learn to adapt their patterns of transactions in an attempt to circumvent the fraud modeling rules. Financial institutions therefore have to rely on continual analysis of transactions to detect new and emerging trends in order to establish and build new rules which to push to the fraud engine.

The task posed to the financial institution and the retailer is finding these emerging trends as fast as possible to limit their exposure. The longer the amount of time it takes for the financial institution to detect a fraud trend the more money that is being lost to the fraud and in the electronic age, minutes can mean thousands of dollars in credit card fraud losses.

While it is a relatively routine process to determine patterns in known fraudulent transactions, this requires that enough transactions for an accurate analysis have already been identified as fraud losses before any preventative steps can be taken to deter the activity. There is a therefore a great need by financial institutions, card issuers and associations for proactive identification of immerging trends, decreasing the time to discovery to minimize risk.

Further, the need to detect of errors in data entry relating to financial transactions is not limited to detection of credit card fraud. Although many data entry processes have been automated, a significant numbers of transactions still require manual entries to be made into back-office financial/business administration systems.

Due to the high number of entries in such systems, and the interrelatedness of the different general ledger accounts in the double entry bookkeeping system, mistakes result in unbalanced entry books. Unbalanced entry books or in general the business administration data can then lead to errors in balance sheets or financial results.

Thus for example a loan entry might erroneously be entered in the books as an asset, when it is a liability leading to errors in the evaluation of a company. Similarly, if the entry protocol for entering data relating to a particular sales or manufacturing process is not followed properly it may not be clear if there has been a profit or a loss, what potentially the impact is on the stock levels etc. Identifying and correcting such errors can be very time consuming.

In view of the above an analysis system is desirable which assists with the identification of erroneous or suspect transactions, entries or events.

SUMMARY

In accordance with one aspect of the present invention there is provided a method of generating a display, displaying data representing a plurality of financial transactions, the method comprising: determining a hierarchy having a tree structure wherein leaf nodes in the lowest level of the hierarchy correspond to sources and destinations associated with financial transactions to be represented; associating elements of the hierarchy with co-ordinates on a display screen; and representing each of the plurality of financial transactions by: determining for each transaction a first set of control co-ordinates comprising the co-ordinates associated with elements in a path in the tree structure connecting the source and destination associated with a financial transaction via the closest common parent in the hierarchy common to the source and destination; determining for each transaction a second set of control co-ordinates for drawing a straight line between co-ordinates associated with the source and destination associated with the financial transaction; calculating as a set of control co-ordinates for representing a transaction weighted averages of corresponding co-ordinates in the first and second set, weighted by a bundling factor; and representing each of the financial transactions as a line drawn utilizing the calculated control co-ordinates for each transaction.

Determining a first set of control co-ordinates may comprise determining a list of nodes on the tree structure for connecting the source and destination associated with a financial transaction via the closest common parent in the hierarchy common to the source and destination and removing the node corresponding to the closest common parent if the source and destination for the transaction are not both child nodes of a single parent node.

Determining a first set of control co-ordinates may also comprise appending as control co-ordinates in the set of control co-ordinates for representing a transaction multiple sets of control co-ordinates associated with the source and destination of the transaction to be represented.

Financial transactions may be represented as lines drawn utilizing the calculated control co-ordinates for each transaction with each financial transaction being represented by an appended series of b-splines as defined by groups of control co-ordinates in the calculated set of co-ordinates.

The lines corresponding to the b-splines may be determined by: determining co-ordinates for a number of points lying on the curve defined by the appended series of b-splines; and calculating co-ordinates for a set of quadrilaterals for representing the transaction on the basis of the co-ordinates of the number of points. The calculation of the co-ordinates for a set of polygons may be such to cause the points lying on the curve defined by the appended series of b-splines to lie on the midpoints of opposing ends of the quadrilaterals and the other sides of the quadrilaterals are parallel to a line connecting the midpoints of the opposing ends. Such quadrilaterals may then be colored.

The coloring of such quadrilaterals may be determined based upon a criterion associated with the transaction represented by the quadrilateral such as the timing, frequency or an amount associated with a transaction. Alternatively the coloring of quadrilaterals may vary along the length of the line drawn to represent a transaction.

Drawing lines representing each of the financial transactions may comprise rendering each of the lines in a graphics buffer and then combining the rendered images. Combining the rendered images may comprise: determining maximum color values for areas where lines overlap; determining color values for rendering lines in a constant color and calculating an alpha blend of the rendered lines; and utilizing the calculated maximum color values and the values of the determined alpha blend of constant color lines to determine the colors to be included in a final display.

The financial transactions represented may include: various kinds of financial transactions such as credit card transactions; debit card transactions, banking transactions; and various kinds of other transaction data like securities trading, insurance, electronic security access data and communications between computers.

In accordance with another aspect of the present invention there is provided a data analysis system for displaying data facilitating visual analysis of financial transactions: the system comprising: a transactions database operable to store transaction records defining financial transactions; a display screen operable to display representations of financial transactions as lines connecting positions associated with a source and a destination for a financial transaction; and a processing module operable to determine a hierarchy having a tree structure wherein leaf nodes in the lowest level of the hierarchy correspond to sources and destinations associated with financial transactions represented by transaction records stored in the transactions database; associate elements of the hierarchy with co-ordinates on a display screen; and cause the display screen to display the representations of the financial transactions by: determining for each transaction a first set of control co-ordinates comprising the co-ordinates associated with elements in a path in the tree structure connecting the source and destination associated with a financial transaction via the closest common parent in the hierarchy common to the source and destination; determining for each transaction a second set of control co-ordinates for drawing a straight line between co-ordinates associated with the source and destination associated with the financial transaction; calculating as a set of control co-ordinates for representing a transaction weighted averages of corresponding co-ordinates in the first and second set, weighted by a bundling factor; and representing each of the financial transactions as a line drawn utilizing the calculated control co-ordinates for each transaction.

BRIEF DESCRIPTION OF THE DRAWINGS

Embodiments of the present invention will now be described in detail with reference to the accompanying drawings in which:

FIG. 6 is a schematic diagram illustrating the assignment of co-ordinates to the nodes of the tree diagram of FIG. 5;

DESCRIPTION OF THE EMBODIMENTS

Figure 1:
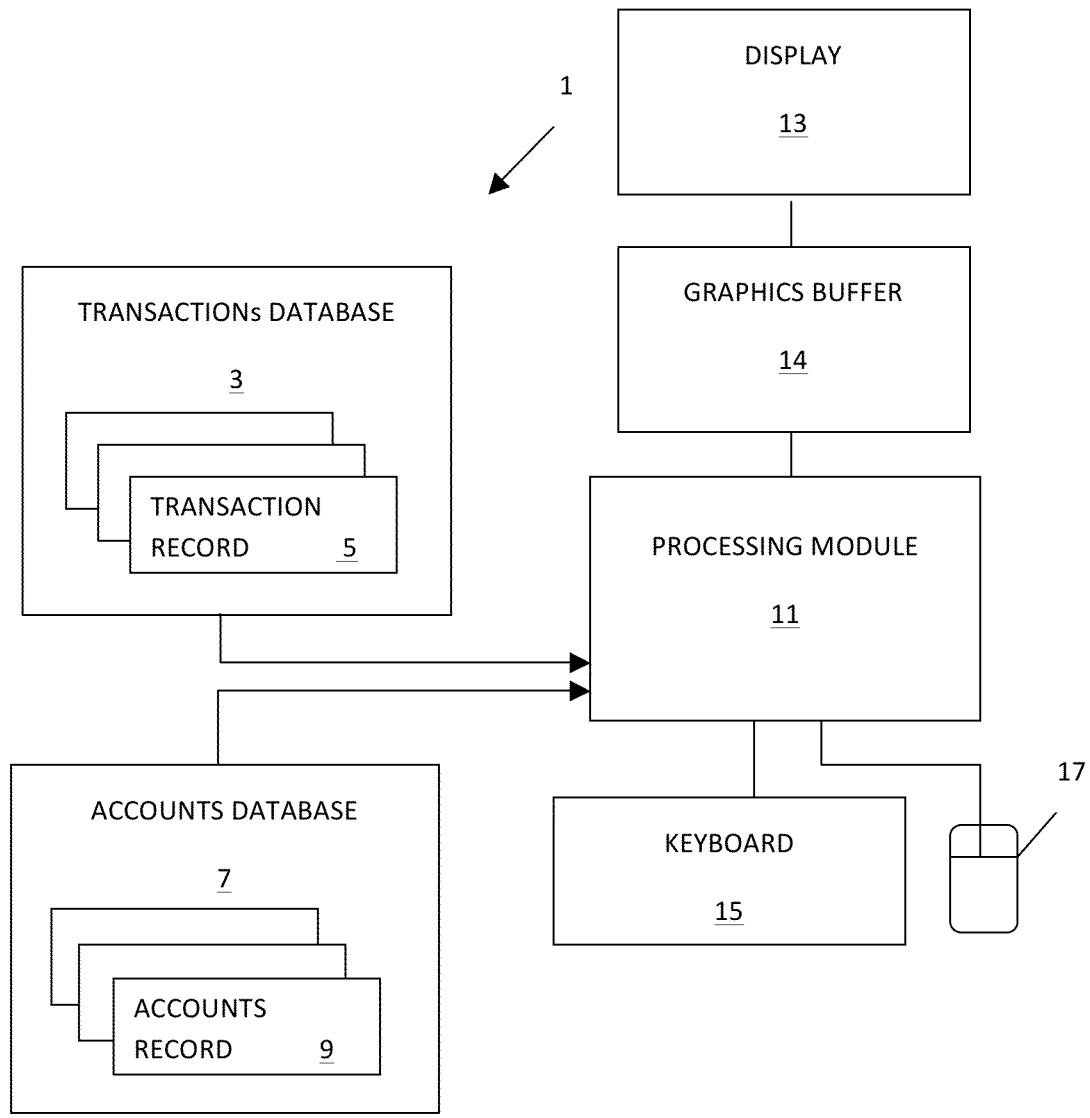
FIG. 1 is a schematic block diagram of a data analysis system in accordance with an embodiment of the present invention.

FIG. 1 is a schematic block diagram of a data analysis system 1 in accordance with an embodiment of the present invention. The data analysis system 1 comprises a transactions database 3 arranged to store transaction records 5; an accounts database 7 arranged to store accounts records 9 and processing module 11. The processing module 11 is arranged to retrieve data from the transactions and accounts databases 3, 5 and generate a graphic representation representing the transactions. Data for rendering representations of the transactions as lines on a display 13 generated and stored in a graphics buffer 14 connected to the processing module 11 and the display 13. In addition the processing module 11 is also responsive to user input via a keyboard 15 and a mouse 17 to enable a user to interact with the display and select groups of transactions for processing.

In this embodiment where the data analysis system 1 is arranged to facilitate the analysis of credit card transaction data, the transactions database 3 will be configured to store transactions data relating to credit card transactions. For fields other than Credit card transactions, the databases will or can be configured otherwise and hold different kinds of transactional data.

In a system for analysing credit card transactions each transaction record 5 stored in the transactions database 3 will comprise a number of data fields, which in the case of credit card transactions will typically include the following:

Date and time of transaction and possibly the time zone where a transaction occurred
Card number and card sequence number
An account number linked to the card
A debit or credit amount
A merchant terminal ID
A merchant terminal location i.e. address, city, country etc
A merchant category code
An amount
A currency The accounts database 7 will store details relating to individual accounts. Typically the accounts records can include data relating to individual accounts such as:

Card holder name, personal ID, TIN, SSN, Virtual identities, or others
Physical address, phone numbers, ip address, etc.

Together the records 5, 9 in the transactions database 3 and the accounts database 7 enable the use of credit cards to be monitored. If unusual patterns of use are detected, further investigation of potential fraud can be initiated. Detection is, however, difficult due to the very large volumes of data involved, most of which represents legitimate transactions. It is for this reason that it is very important how the data is processed and the results of that processing are displayed as having the processing module 11 generate display data which makes potentially suspect transactions more apparent to a user and thereby greatly facilitates the detection of fraud.

As will be described in detail, in accordance with the present application data representing transactions is processed in a manner which enables large volumes of transaction data to be displayed simultaneously and facilitates user selection of subsets of the transaction data and rapid update of the display. This then enables an investigator to focus on transactions which share certain common attributes for further investigation.

Thus for example an organized credit card fraud ring hacks into the database of an online retailer and gains access to 200 customer records which contain information about the account holder along with the holder's credit card numbers.

The credit card fraud ring knows they only have a limited amount of time to utilize the data before the online retailer discovers the intrusion into his customer database and notified the card issuer to block the account numbers involved in the crime.

Within minutes of obtaining the data the credit card fraud ring begins utilizing the stolen account and credit card to make purchases at ecommerce sites online, where they purchase goods to be shipped to intermediaries who work for the credit card fraud ring. Each credit card account is used continually for "card not present" transactions until the card is declined for reaching the spending limit on the account. The credit card fraud ring then switches to the next account and continues the activity until all the cards have been exhausted.

The analytical process, apparatus and method described in this embodiment is designed to display and help the user detect the anomalous patterns resulting from anomalous behavior. The patterns are the result of a sequence of transactions or transaction flow, in the above example the transaction take the form of credit card transactions. By visualization the patterns that emerge in the transaction flow, the credit card fraud analyst can more quickly detect anomalies that differentiate from the "normal" pattern of legitimate transaction by leveraging visual analytics. The human eye and brain can more quickly adapt to changes in visual representations of data then to representations where data is presented as indexes in rows, columns or tables.

The apparatus and method are designed for the purpose of visually representing the relationships and sequences that exist within the transaction, the detection of irregular activity occurs faster and more accurately as visually it stands out in the crowd of legitimate transactions. The greater the amount of data which can be visualized the more effective the analyst or observer/user can detect patterns. The more accurate and timely the analysis can be performed which is essential in electronic transactions, including those of the financial kind and certainly for fraudulent card transactions which receive very large quantities of transaction at any given time. The larger the amount of data that a tool can visualize the larger the amount of time can be conceptualized thus the more stable and accurate the pattern analysis can be.

This can lead to a financial institution being able to quickly identify a single point of sale where credit card information is being compromised from, determine the time frame of the compromise and take proactive steps to ensure the potentially compromised information cannot be used to conduct transactions before the fraud ever takes place.

To facilitate the identification of suspect transactions, as will be described, in this embodiment, transactions are illustrated by lines connecting an origin, displayed as a credit card account number or any of its other uniquely attached attributes and a destination indicative of a point of sale terminal, either online or at a physical location, or again any of its uniquely attached attributes. The processing module 11 then generates a visual display which causes representations of transactions sharing similar characteristics to be bundled together.

Figure 2:
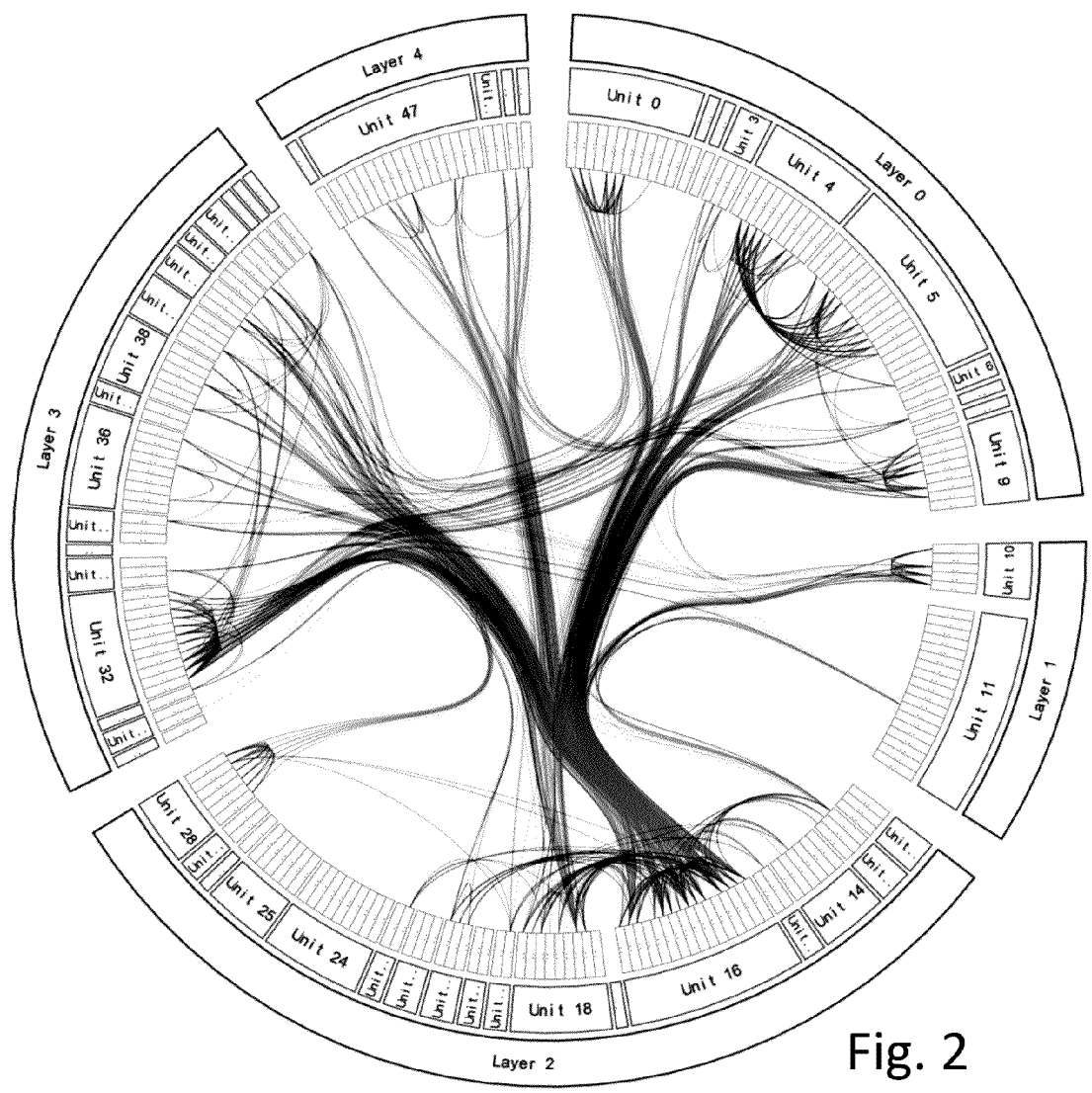
FIG. 2 is a schematic illustration of a user interface representing transactions to a user.

FIG. 2 is a schematic illustration of a user interface representing transactions to a user. In FIG. 2 curved lines connect points at the perimeter of a circle. Each of the lines is shaded from lighter to darker to indicate a direction of connection. Around the perimeter points are arranged into a hierarchy such as for example a hierarchy of locations e.g. country, region, sub-region, which can correspond to locations of card holder addresses and point of sale locations. These are illustrated by the curved sections at the perimeter of the illustration with the elements at the top of the hierarchy shown at the outside of the circle labeled layers 0-4, the new level of the hierarchy shown as units 1-50 and the lowest level of the hierarchy shown adjacent the lines in connecting points at the perimeter of the circle.

As indicated, transactions sharing common portions of a hierarchy are bundled together to indicate a volume of flow between two locations. As will be described by selecting data either by selecting groups of locations or a subset of transactions etc a user can home in on a group of suspect transactions for more investigation.

Additionally the display can be modified to highlight certain information. Thus for example in certain circumstances it may be desirable to distinguish between the source and origin of transactions. This could enable a subset of transactions to be displayed. The screen display could then be modified to color code the representations of the transactions to highlight some other aspect of the transactions such as the timing of the transactions or the frequency or size of the transactions to make potentially suspect patterns more apparent.

The processing of the processing module 11 to generate a display such as is shown in FIG. 2 will now be described in detail with reference to FIGS. 3-10.

Figure 3:
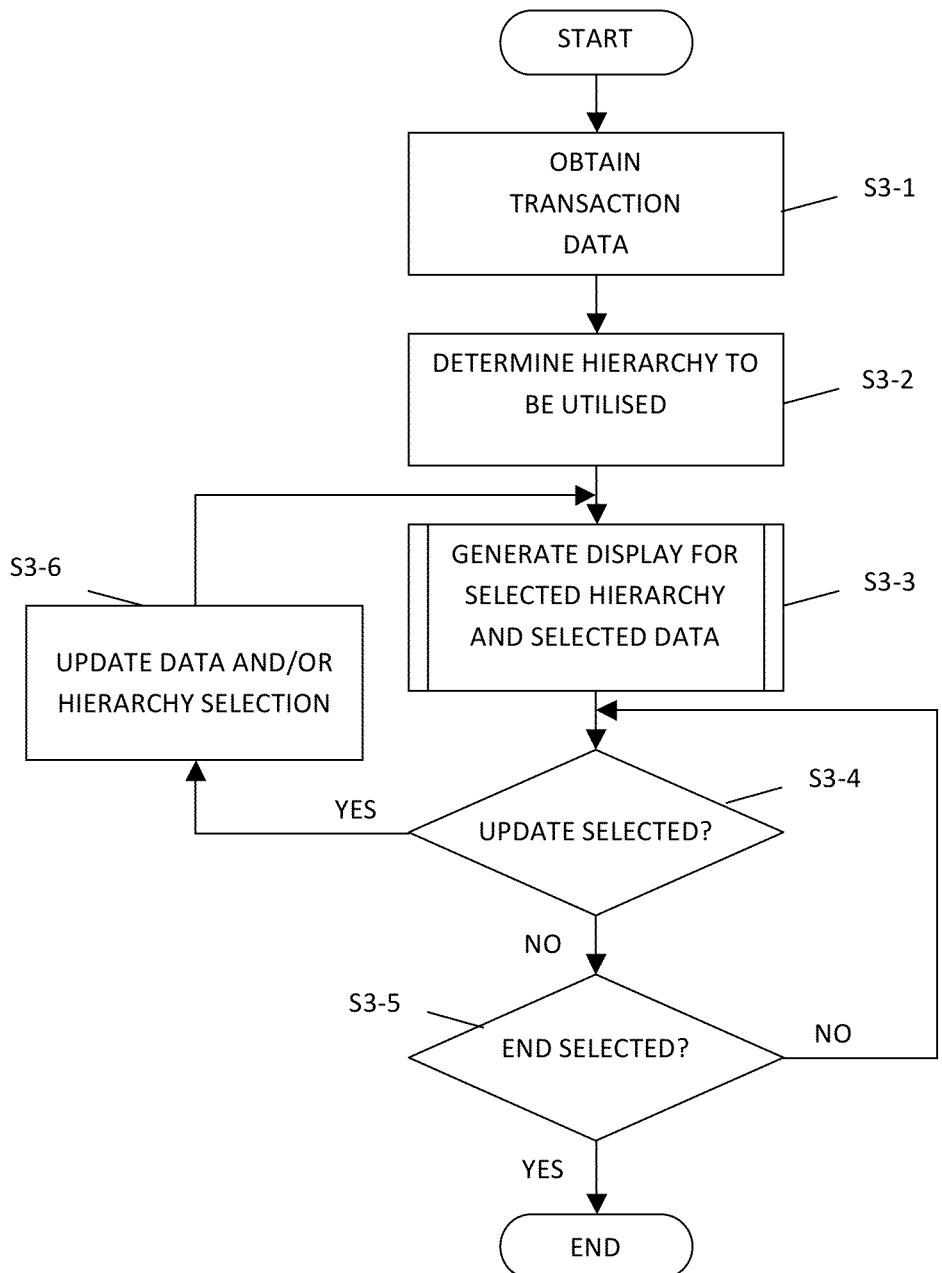
FIG. 3 is a flow diagram of the data processing of the data analysis system of FIG. 1.

Referring to FIG. 3 which is a flow diagram of the processing undertaken by the processing module 11, as an initial step (s3-1), the processing module 11, in response to user input via the keyboard 15 and mouse 17 initially accesses the transactions database 3 to identify transaction records 5 which are to be utilized to generate a display 13. In the case of this initial step the records 5 which are to be displayed can be selected on any basis as determined by the user and indicated to the processing module 11 by user input. Thus for example a user could select a group of records corresponding to a particular time period, location, or transaction amount, all of which is recorded either directly or indirectly within the transaction records 5 themselves. Alternatively some indirect measure could be utilized to select the transactions for display such as by processing transaction records 5 to identify accounts which for example are associated with unusually high frequency of transaction or high transaction volumes and currency amounts.

Once the initial dataset has been determined, the processing module 11 then determines (s3-2) in response to user input the hierarchy against which the selected transaction data is to be displayed.

The hierarchy to be utilized could be determined in response to user input selecting a pre-stored hierarchy from a list. One example of such a hierarchy would be a hierarchy based on location of account holder and merchant terminal. In such a case the various locations could be grouped by geographic location into countries, regions and sub-regions etc.

Alternatively an artificial hierarchy could be constructed from the available data fields in the transaction records 5 and account records 9. Thus for example a user might decide to categories transaction amounts into a number of ranges and assign this as the top level of the hierarchy, followed for example by groups of categories in the MCC code for a second level in the hierarchy, with high level location data being assigned to a third level in the hierarchy.

Any user selected hierarchy could be utilized provided the selected hierarchy enables individual transactions to be assigned both a source location and a destination location within the hierarchy. In the case of a simple geographical hierarchy it will be appreciated that both the source (i.e. a card holder address location) and the destination (i.e. the point of sale location) can utilize the same hierarchy (e.g. country, region sub-region, etc.). In other cases the hierarchies could be utilized where source locations and destination locations are determined using different data sets. All that is required is that the selected hierarchy data is sufficient to enable transaction data to be identified with distinct pairs of items of data.

Having entered or selected the hierarchy to be utilized to order the transaction data to be displayed, the processing module 11 then (s3-3) proceeds to generate a display image for the currently selected data set and organizational hierarchy.

The processing undertaken by the processing module 11 to generate display data will now be explained with reference to FIGS. 4-10.

Figure 4:
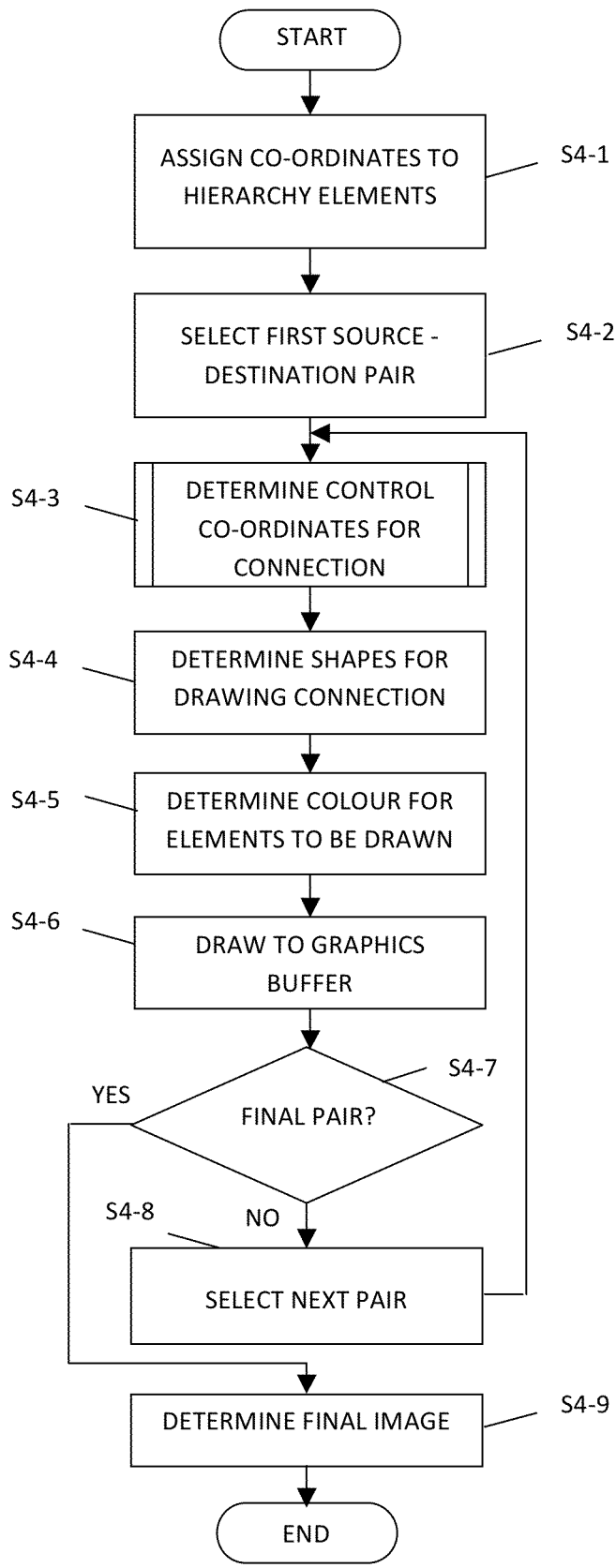
FIG. 4 is a flow diagram of the processing of the data analysis system of FIG. 1 for generating display data.

Turning first to FIG. 4 which is a flow diagram of the processing undertaken by the processing module 11, initially (s4-1) the processing module 11 assigns each of the elements in the hierarchy being used to a screen location.

Figure 5:
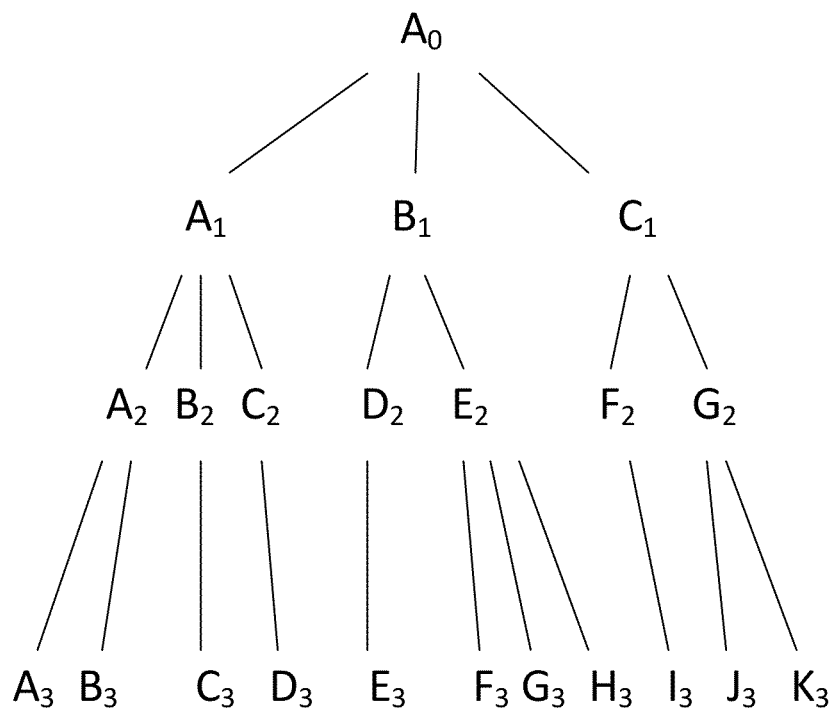
FIG. 5 is a tree diagram illustrating an exemplary hierarchy.

FIG. 5 is a tree diagram illustrating an exemplary hierarchy. In such a tree diagram a route node $A_0$ is provided at the top of the hierarchy. A first set of categories, shown in the figure as $A_1$, $B_1$, $C_1$, forms the first level of the hierarchy. The next level of the hierarchy is shown as $A_2$, $B_2$, $C_2$, $D_2$, $E_2$, $F_2$, $G_2$. Finally a third layer of the hierarchy is shown as $A_3$, $B_3$, $C_3$, $D_3$, $F_3$, $G_3$, $H_3$, $I_3$, $J_3$, $K_3$. Thus for example if the hierarchy were to represent geographical location $A_1$, $B_1$, $C_1$ might correspond to countries, $A_2$, $B_2$, $C_2$, $D_2$, $E_2$, $F_2$, $G_2$ might correspond to regions and $B_3$, $C_3$, $D_3$, $F_3$, $G_3$, $H_3$, $I_3$, $J_3$, $K_3$ might correspond to sub-regions.

Figure 6:
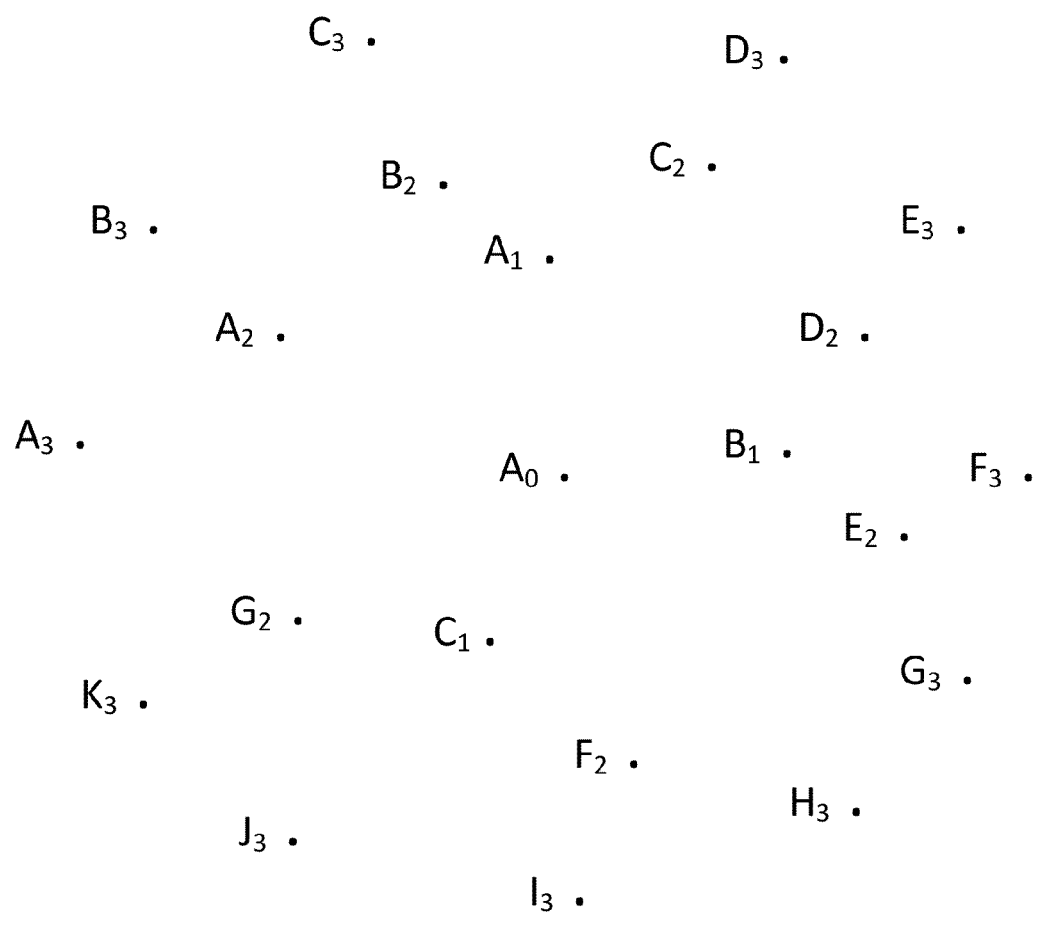

In the present embodiment, once a hierarchy has been identified to the processing module, the various items on the hierarchy are assigned a screen location. FIG. 6 is a schematic diagram illustrating the assignment of co-ordinates to the nodes of the tree diagram of FIG. 5. In FIG. 6 the various nodes of the tree of FIG. 5 have been allocated positions corresponding to a series of concentric circles with the route node $A_0$ placed in the centre and the remaining nodes placed in successive concentric circles about the route node with the nodes at lower levels of the hierarchy shown in sections next to their parent nodes in the higher sections of the hierarchy.

Having assigned a set of co-ordinates for the elements of the hierarchy, the processing module then proceeds to calculate and draw a series of lines representing each of the transactions which is to be plotted. More specifically, first of all an initial transaction to be plotted is selected (s4-2). The processing module then (s4-3) determines a set of control-co-ordinates to represent the transaction. As will be explained these control co-ordinates are selected on the basis of the co-ordinates associated with nodes on the hierarchy and a bundling factor which cause the resultant line curve to a lesser or greater extent so that lines associated with corresponding portions of the hierarchy are shown as being bundled together.

Figure 7:
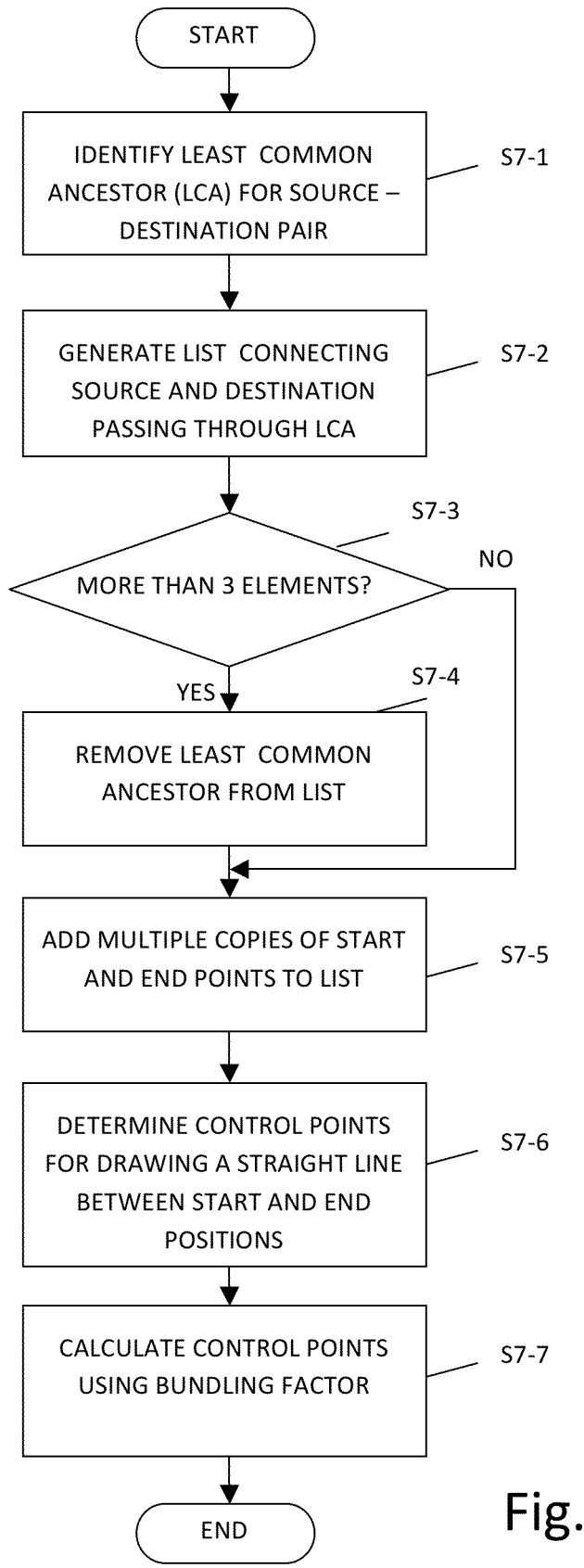
FIG. 7 is a flow diagram of the processing of the data analysis system of FIG. 1 to draw a connection between two positions associated with leaf nodes in an exemplary hierarchy.

FIGS. 7 and 8 are a flow diagram of the processing of the processing module to determine a set of control points and a schematic illustration of a connection between two positions associated with leaf nodes in an exemplary hierarchy.

Referring initially to FIG. 7, having selected a transaction to be illustrated on the display 13, the values for the source and destination associated with a line to be drawn are identified and their relative locations on the selected hierarchy are determined.

Thus for example say a transaction is to be illustrated where the lines are to be drawn connecting positions corresponding to an account holder's address and a merchant terminal location. In such a case, nodes on the hierarchy corresponding to the account holder's address and a merchant terminal location would be identified. The processing module 11 then determines (s7-1) the least common ancestor (LCA) for the two identified locations within the hierarchy being used which connect the nodes corresponding to the account holder's address and a merchant terminal location.

Taking the hierarchy of FIG. 5 as an example, in the case of nodes $A_3$ and $D_3$, data corresponding to the hierarchy would be processed to determine that stepping back through the tree the least common ancestor for $A_3$ and $D_3$ would be $A_1$. It will be appreciated that identification of the least common ancestor could be determined using any conventional process for determining the common parent for nodes in a tree structure.

Thus for example if the hierarchy of FIG. 5 were to correspond to geographical locations where location $A_1$, $B_1$, $C_1$ correspond to countries, $A_2$, $B_2$, $C_2$, $D_2$, $E_2$, $F_2$, $G_2$ correspond to regions and $A_3$, $B_3$, $C_3$, $D_3$, $F_3$, $G_3$, $H_3$, $I_3$, $J_3$, $K_3$ correspond to individual towns in the example above it would be determined that the transaction linking a card holder with an address associated with the town identified by $A_3$ utilized their card in another town $D_3$ in a different region but in the same country as $A_3$.

Having identified the least common ancestor for the source and destination points to be illustrated, the processing module 11 then proceeds (s7-2) to generate a list for the path connecting the source node to the destination node which passes via the least common ancestor. This can also be determined using conventional techniques.

Thus in the case of nodes $A_3$ and $D_3$ for the example hierarchy of FIG. 5 the following path data would be determined $A_3$, $A_2$, $A_1$, $C_2$, $D_3$.

The processing module 11 then (s7-3) proceeds to determine whether the generated list contains at least three elements. If this is not the case, this will mean that the nodes associated with the transaction to be illustrated share the same parent node. In this case the list of nodes is left unamended. If, however the path data contains more than one element, in this embodiment the reference to the closest least common ancestor is removed (s7-4) from the list.

Thus in the case of the path data $A_3$, $A_2$, $A_1$, $C_2$, $D_3$ and the hierarchy of FIG. 5, the path data would be modified to become $A_3$, $A_2$, $C_2$, $D_3$. In contrast where path data for say data associated with nodes $A_3$ and $B_3$ were to be determined, here the least common ancestor would be identified as being node $A_2$ and path data for connecting nodes $A_3$ and $B_3$ would be generated as $A_3$, $A_2$, $B_3$. In such a case as the path data includes only three elements no modification of the path data would be made and the generated path data would remain as $A_3$, $A_2$, $B_3$.

After having removed the reference to the least common ancestor from path data containing at least three elements, the path data is then (s7-5) modified by appending three copies of the first and last elements in the list to the beginning and end of the list respectively.

Thus for example in the case of path data comprising the following list $A_3$, $A_2$, $C_2$, $D_3$, the list would be modified to become $A_3$, $A_3$, $A_3$, $A_3$, $A_2$, $C_2$, $D_3$, $D_3$, $D_3$, $D_3$.

At this stage, the co-ordinates associated with the elements in the list of path data will define a first set of control points for drawing a line comprising appended b-slines to connect the positions at the beginning and end of the list. Such a curve will bend towards the various control points associated with nodes at different levels of the hierarchy and hence bend towards the co-ordinates of the various positions associated with elements of the hierarchy being utilized such as is illustrated in FIG. 6.

Merely drawing a line based on the co-ordinate positions associated with the elements in the data path would only enable a connection between two points to be drawn in a single way and would not enable a user to vary the extent to which lines deviate towards the various control points. The ability to vary the extent to which lines representing transactions deviate is advantageous as stronger deviation enables connections associated with shared higher elements in the hierarchy to be grouped together which facilitates the selection of transactions for greater scrutiny.

Figure 8A:
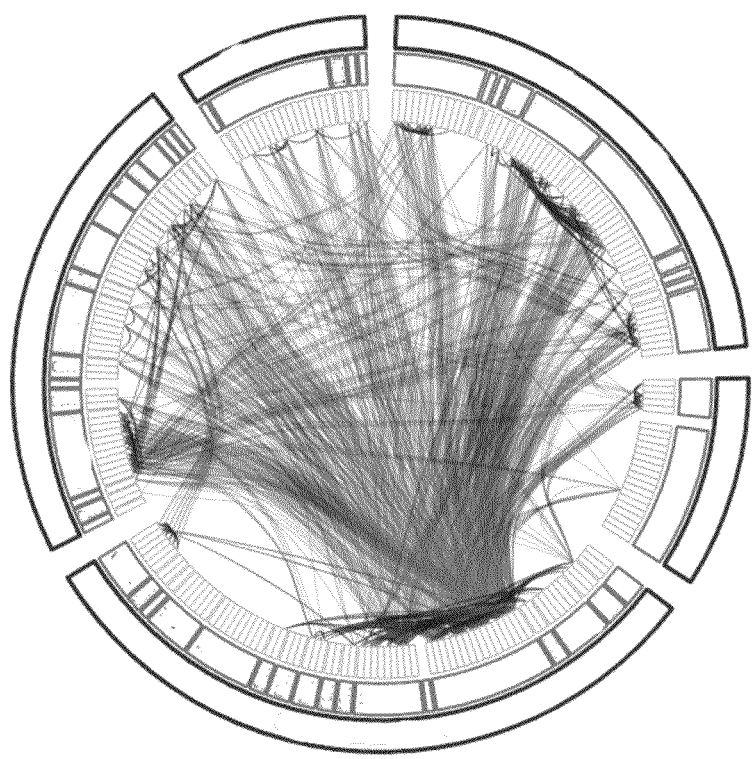
FIG. 8A and FIG. 8B are schematic illustrations of the manner in which the illustration of connections between a plurality of points can be varied in dependence upon a bundling factor.
Figure 8B:

This is illustrated by FIG. 8A and FIG. 8B which are schematic illustrations of the manner in which the illustration of connections between a plurality of points can be varied in dependence upon a bundling factor. In FIG. 8A transactions associated with shared elements in the upper portions of the hierarchy are shown by lines which deviate less than in FIG. 8B. As can be seen by inspecting FIGS. 8A and 8B, this means that the extent to which transactions share such upper elements in the hierarchy is less clear in FIG. 8A compared with FIG. 8B. This is achieved by bundling the representations more closely together in the central portions of the figures.

Bundling of lines is also used to free up screen space so structure and patterns can become visible and more easily detected and recognized by the user. The bundling operation is essential as the display mentioned in this embodiment can hold very large numbers of lines each representing a set of transactions. Display real estate (pixels) does not allow such a quantity of lines to be presented on the display screen in a single instance; rather the lines are displayed in a (virtual) overlay mode. Long before the physical limits of the computer display are reached a user will no longer be able to easily identify individual line(s) of interest, instead the human eye and brain only perceive clutter as shown in FIG. 8A. The bundling as shown in FIG. 8B provides structure to the image for better human perception and comprehension and helps the user identify the flow of transactions. In case the user wishes to see details of sub-sets or even individual transactions the user can move his mouse to the perimeter of the line view and by hovering over the lines is able to highlight these while the other lines are faded into the background. To render individual lines visible the system allows for dynamic interrogation of parts of the display that renders the data set, as a zoom-in function.

In order to provide the ability to vary the extent to which lines representing transactions are bundled together, having determined path data identifying a first set of control points corresponding to the co-ordinates associated with the list of path data, the processing module 11 then (s7-6) proceeds to determine an alternative set of control points for drawing a straight line between the end points of the line defined by the first set of control points.

Figure 9:
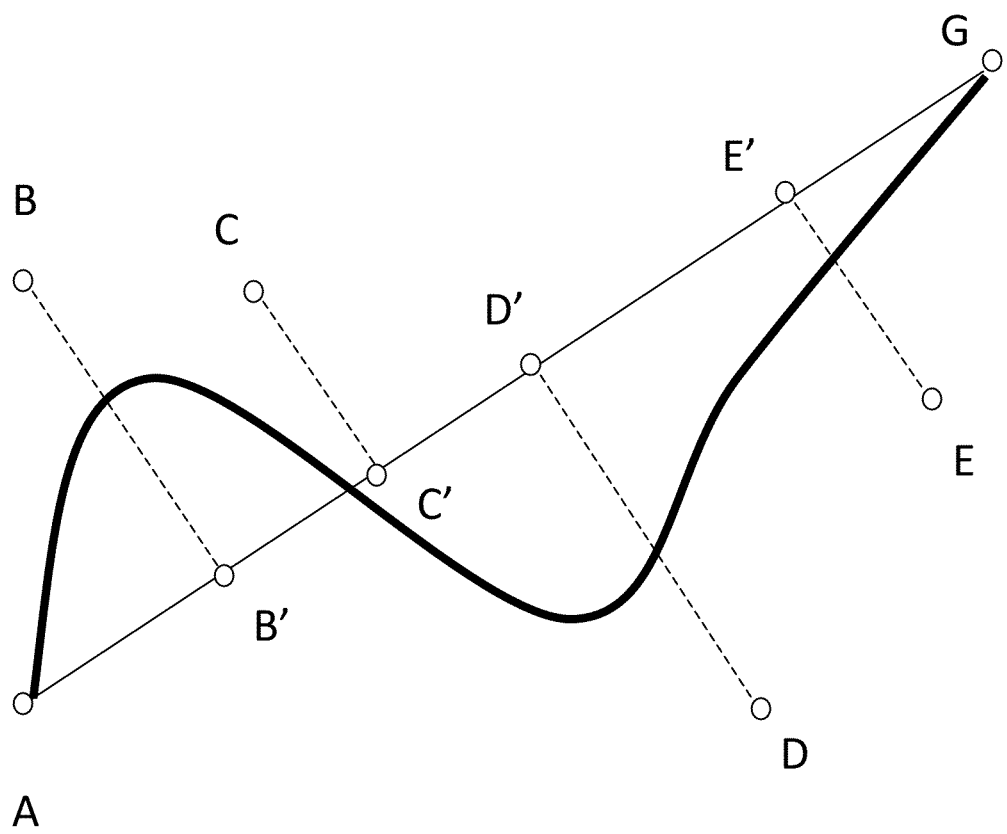
FIG. 9 is a schematic illustration of a connection between two positions associated with leaf nodes in an exemplary hierarchy.

FIG. 9 is a schematic illustration of a connection between two positions labeled A and G connected by a curve shown by a thick line in FIG. 9. The curve comprises a set of appended b-splines defined by control points A, B, C, D, E, F, G.

An alternative connection between the two positions A and G would be a straight line between those two points. Such a line can also be represented by a set of appended b-splines where the control points for such b-splines have co-ordinates which lie along the line connecting A and G.

An alternative set of control points for a straight line connection can be derived from the co-ordinates associated with positions A and G and then selecting a number of points on the line. In this embodiment the alternative control points B', C', D' and E' are determined by calculating the positions on the line A-G nearest to the positions of the control points B, C, D and E respectively.

Control points for a line connecting A and G which curves to a lesser or greater extent can then be determined (s7-7) by using a weighted average of the co-ordinates associated with the original and the alternative control points. That is to say control points for drawing a connection between A and G can be selected to be at positions along any of the dotted lines shown in FIG. 9 connecting B and B', C and C', D and D' and E and E'. The control points for such lines can be calculated using the following equation:

Control point co-ordinates=(1−B)*(original co-ordinates+B(alternative co-ordinates)

where B is the selected bundling factor to be utilized.

If a bundling factor of 1 is selected the curved lines will utilize the original co-ordinate positions as control points whereas if a bundling factor of 0 is selected connections will be represented by straight lines connecting the start and end points.

Overlapping groups of four of the set of generated control points can then be used to draw a line between the positions associated with the source and destination elements. More specifically each set of four control points can be utilized as control points for a cubic b-spline with the entire line connecting the source and destination elements being the piece wise cubic b spline formed by the concatenation of these individual b-splines Returning to FIG. 4 having determined a set of control points for representing a transaction as a b-spline connecting two positions corresponding to the source and destination for the transaction, the processing module 11 then proceeds to determine a set of shapes (s4-4) for drawing the each b-spline using the control points.

Mathematically a b-spline is fully defined based solely on the co-ordinates associated with a set of control points. When rendering a b-spline as an image, it is necessary to break the mathematical curve which is to be drawn into a set of shapes which can be rendered by the computer. This is necessary because in order to be rendered the curve must be given a thickness so that the rendering of the curve can be seen.

Figure 10:
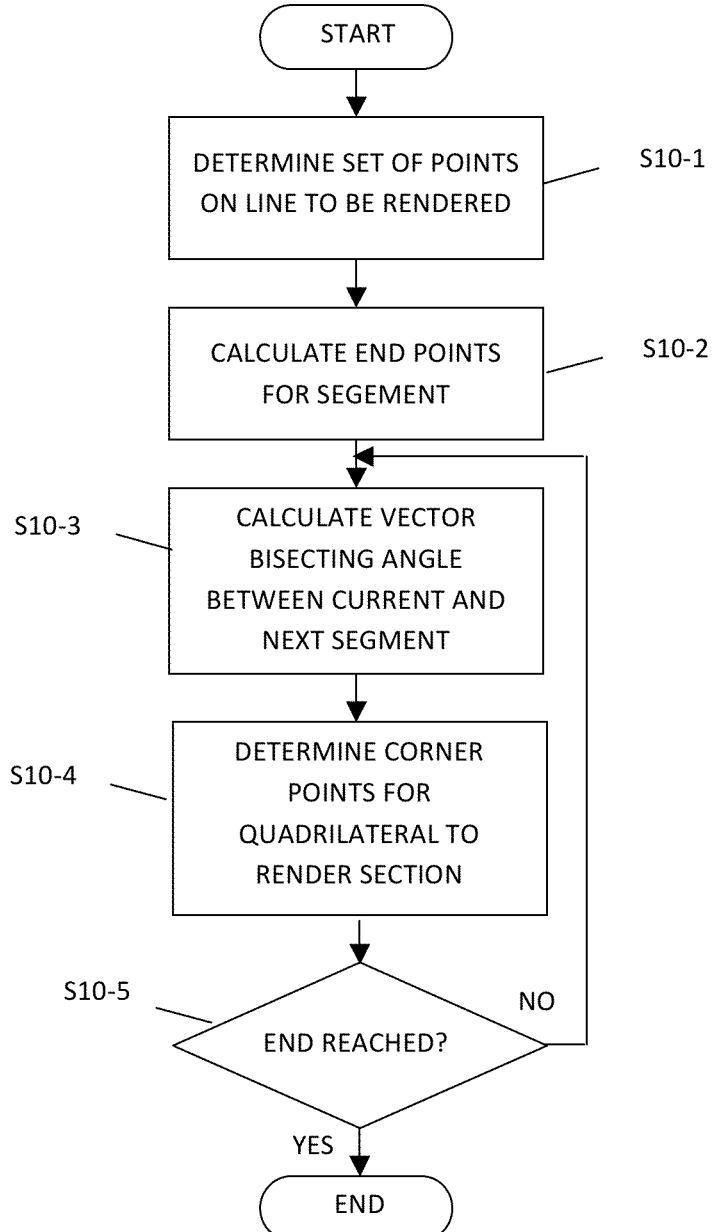
FIG. 10 is a flow diagram of the processing undertaken to determine a set of shapes to represent a curve.

The processing to determine such a representation will now be described with reference to FIGS. 10 and 11 which are a flow diagram of the processing of the processing module 11 and an illustrative section of a curve to be rendered To achieve such a rendering, initially (s10-1) a set of points on the line to be rendered is determined. The co-ordinates for the points can be determined directly by processing the control co-ordinates for the b-spline for the curve to be rendered. These will comprise a set of points all of which should lie at the middle of the curve which is to be rendered.

Figure 11:
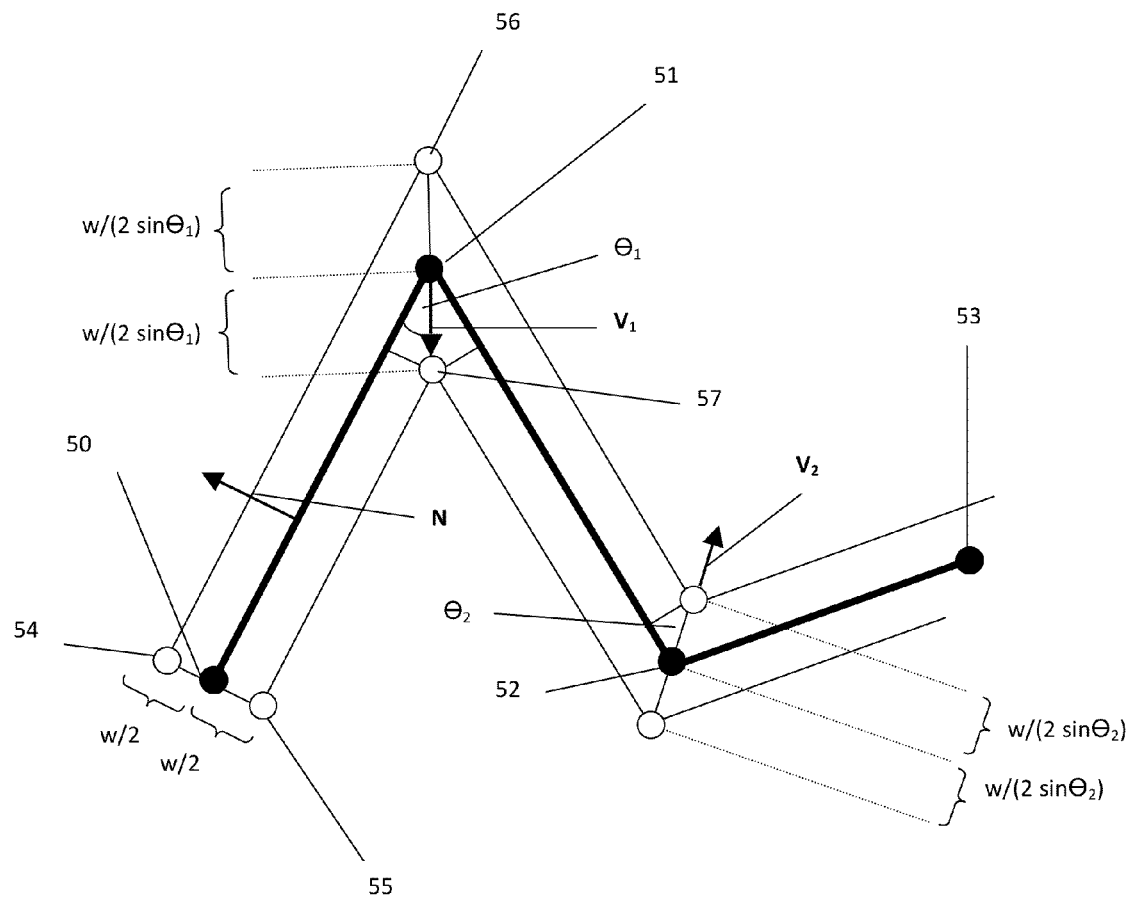
FIG. 11 is an illustrative section of a curve to be rendered.

FIG. 11 is an illustrative section of a curve to be rendered. In the illustration the points 50,51,52,53 lying on the thick black line comprise points mathematically determined to correspond to the portion of the line to be rendered.

Starting with the first point 50, the processing module then (s10-2) determines co-ordinates for the edge of the line at that point. This is achieved by determining normal (N) to a vector connecting the first 50 and second 51 points on the line a length of ±w/2 from the first point 50 and assigning these co-ordinates to the corners 54,55 of the beginning of the line to be rendered. In this way two co-ordinates 54,55 separated by a distance w corresponding to the selected width of the line to be rendered are identified where the first selected point 50 lies in the middle of the two points 54,55.

Having determined the initial end points 54, 55, the processing module 11 then proceeds to calculate (s10-3) a unit vector ($V_1$) which bisects the angle formed by lines connecting the first 50 and second 51 and the second 51 and third points 52 which lie on the mathematical line being rendered.

Co-ordinates for the quadrilateral representing an initial section of the curve are then (s10-4) determined by identifying points 56, 57 a distance±w/(2 sin $\theta_1$) $V_1$ from the second point 51 lying on the mathematical curve being rendered where $\theta_1$ is the angle between the line connecting the first and second points 51 on the curve being rendered and the vector $V_1$.

Having calculated co-ordinates for the quadrilateral for rendering the first section, the processing module 11 then checks (s10-5) to see if the complete line has now been rendered.

If this is not the case the processing module 11 then proceeds to calculate (s10-3) a vector bisecting lines connecting the next two pairs of point on the mathematical curve being rendered. Thus having processed the first 50, second 51 and third 52 points on the line the processing module 11 will then determine a vector $V_2$ bisecting the lines connecting the second 51 and third 52 and the third 52 and fourth 53 points on the curve being rendered.

Once this vector has been determined, the end points for the next quadrilateral for representing the next section of the curve is then (s10-4) determined utilizing the vector $V_2$ and the angle between the lines connecting the second 51 and third 52 and the third 52 and fourth 53 points on the curve being rendered $\theta_2$ bisected by the vector $V_2$. After which the processing module 11 once again checks (s10-5) whether the end of the curve being rendered has been reached.

Returning to FIG. 4, having determined a set of quadrilaterals to represent the line connecting the positions corresponding to the source and destination for a transaction, the processing module then (s4-5) determines a coloring for the line.

The coloring for the line can be determined in a number of different ways, depending on what information a user wishes to highlight. If so selected by a user, the processing module 11 may be arranged to render lines which vary in color say from red to green to enable a user to distinguish the source and destination for a represented transaction. In such a case the determination for the coloring of the line segments would be made where the color assigned to a portion of a line was dependent upon the portions position on the line.

Alternatively, the processing module 11 could be arranged to color code the transactions based on some other factor. For example different colors could be assigned to transactions depending upon the timing of the transactions, the size of the transactions or the frequency with which particular transactions were made. Such a coloring would then enable a user to identify transactions sharing certain criteria for further analysis.

Having determined the coloring to be used to color the line representing a transaction, the processing module 11 then (s4-6) renders the line to the graphics buffer 14 using standard open GL techniques.

When rendering different lines corresponding to different transactions the lines could be rendered in order with earlier rendered lines being overwritten by later rendered lines. However where lines are colored to indicate additional information about transactions it is preferable that when the renderings of different transactions are combined the processing module 11 determines maximum color values for any particular position based on the rendering. Such an approach has the benefit of highlighting lines which differ from most transactions and hence make outliers more apparent.

Having rendered the currently selected transaction as a line on the display, the processing module 11 then determines (s4-7) whether the final transaction has been reached. If this is not the case the next transaction is selected (s4-8) and processed (s4-3-s4-5) and rendered (s4-6) to the graphics buffer 14 before the processing module checks (s4-7) once again whether the final transaction has been reached.

When the final transaction has been processed the processing module 11 then can cause the image stored in the graphics buffer 14 to be displayed (s4-9).

In some embodiments it may be preferable to modify the content of the graphics buffer 14 before display. In particular where lines representing transactions are rendered by determining maximum color values for particular channels at points of overlap between lines representing different transactions, the processing module 11 may proceed to modify the color values to mimic some kind of alpha blending for the representation.

As noted above where lines are rendered which overlap one another one approach to deal with such areas is merely to utilize the final overwrite and display that information on the screen. Another approach would be to take an alpha blend of the multiple representations. This would cause areas of overlap to appear darker and hence would provide a user with information about the numbers of transactions in an area of overlap. However utilizing an alpha blend approach averages out color representations and hence where a transaction differs in appearance from the majority of transactions shown in a particular portion of the screen that difference may not be apparent because the single outlier transaction will have a very limited influence on the average appearance of the area of overlap.

It is for this reason that it can be preferable to render areas of overlap utilizing maximum color values. In this way if say for example the majority of transactions in a portion of the screen were to be rendered green and an outlier transaction were to be rendered red the existence of the outlier transaction would still be apparent on the screen.

A disadvantage with such an approach is that utilizing maximum color values to represent areas of overlap rather than utilizing alpha blending results in images where the number of times an area is overwritten is not apparent. Thus by utilizing just the maximum color values for a position it ceases to be possible to identify the numbers of transactions rendered in a particular area of the screen.

A compromise approach, can however, be achieved which enables outlier transactions to be highlighted and for the numbers of transactions rendered in a particular area to be made apparent. This is to render areas of overlap selecting maximum color values and then to combine the results with a re-rendering of the lines in solid color (i.e. black or white) using alpha blending. The re-rendering in solid color then provides data as to how the maximum color values should be altered to account for the numbers of lines overlapping at a particular position.

When a representation of the selected transactions has been rendered and displayed on the screen a user can then input selections via the keyboard 15 and mouse 17 to vary the display.

Typically the user input will instruct the processing module 11 to re-render the display based on an alternative selection of transactions, attributes belonging either to transactions or elements, hierarchy and/or rendering.

FIGS. 12-16 are illustrative screen displays of the above described system in use for analyzing transaction data relating to bookkeeping entries and bank transactions.

Figure 12:
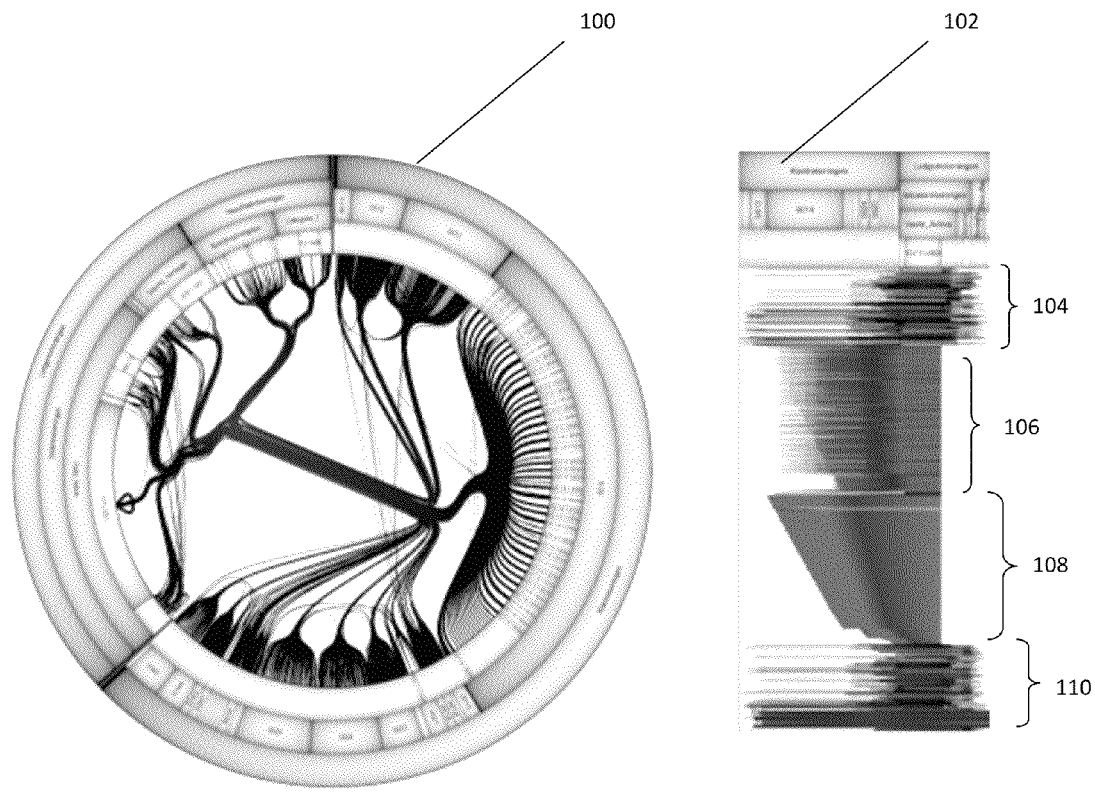
FIGS. 12-17 are illustrative screen displays of the above described system in use for analyzing transaction data relating to bookkeeping entries and bank transactions.

As shown in FIG. 12, in this example the screen display is shown as being in two parts. A first section 100 in which transactions are shown as lines connecting sources and destinations arranged in a circle and a second section 102 where transactions are shown as line straight line arranged in order of time or sequence associated with the transactions.

In this example the hierarchy used comprises headings associated with general account ledgers, sub-ledgers, sus-pense-accounts, balance-accounts, profit and loss accounts and individual customer accounts in a bank organized by branch. The hierarchy contained in a ledger scheme is particularly suitable for analysis using the approach described in the present application as it defines a detailed, and relatively stable hierarchy against which transactions can be analyzed. Typically a chart of accounts is only changed once a year if ever. In the figures in the first section 100 of the screen the individual accounts are shown occupying approximately two thirds of the circle extending from the top of the Figure clockwise with the account ledger hierarchy extending along the remaining section of the circle.

In the second section 102 of the screen the hierarchy used is shown above the lines representing transactions. In this section of the screen the individual lines extend between points corresponding to the sources and destinations of transactions.

In both the first and the second sections 100,102 lines corresponding to transactions are shaded to indicate (a) selected attribute(s), for example direction from source to destination, or age of the flow of the transaction. In embodiments this may be best shown using color. FIG. 12 shows an illustration of 8777 lines corresponding to transactions in both of the sections 100,102 of the screen.

The illustration of transaction data in the manner shown in FIG. 12 facilitates user investigation and manipulation of the transaction data. In particular the first section 100 of the screen using the selected hierarchy illustrates money flowing between accounts and corresponding accounts ledgers. Whereas the second section 102 provides a user with information relating to the timing of individual entries. The ordering of the lines in the second section 102 could be based either on the basis of record numbers associated with the transactions or alternatively with time data associated with transactions. The display may include a representation of a scale to identify the range of transactions being displayed. Thus for example an indication of a range of records or a range of dates or times might be displayed.

Using the keyboard 15 or the mouse 17, a user can then drill down within the available information to investigate further.

Thus for example a user might input criteria for selecting transactions limited to a certain time period, amount or frequency to be displayed and only transactions meeting such criteria would then be extracted from the transactions database 3 for display on the screen. The screen display 13 could be arranged to display user selectable menus to facilitate such selection or entry of data indicating the selection criteria to be used.

Alternatively a subset of the displayed transactions could be made by identifying a section of the screen using a pointer under the control of the mouse 17. In such a case it would be necessary to identify which transactions resulted in the rendering of display data to a particular section of screen. This could be achieved by checking the display data rendered to the graphics buffer 14 which was utilized to render a particular display.

A problem with such an approach arises where transactions are selected by drawing a line on the screen to identify transactions to be investigated. This is because it is possible that the line will not intersect with pixels which are rendered. This is particularly a problem where an oblique line is drawn as it is possible that a rendering of an oblique line will pass through another line at a different angle without there being any pixels in common. Such a problem can be avoided by utilizing the identification of a line with a pointer to define a box of a number of pixels thicknesses and identify renderings which occur anywhere in that box. However this can result in too many transactions being identified as being of interest.

An alternative approach would, however, be to utilize the drawing of a line to identify an angle and re-render a representation of the current display in the graphics buffer 14 without updating the display where the rendering applied a rotation to the display based on the angle of the line. This would then ensure that the selected line corresponds to a row or column of pixels in the re-rendered image. In such a case any renderings of transactions which correspond to the selected portion of the row or column could be reliably identified.

In the case of the transactions shown in FIG. 12, it is apparent from the Figure that the transactions shown in the second section 102 of the screen naturally form 4 blocks 104-110.

Figure 13:
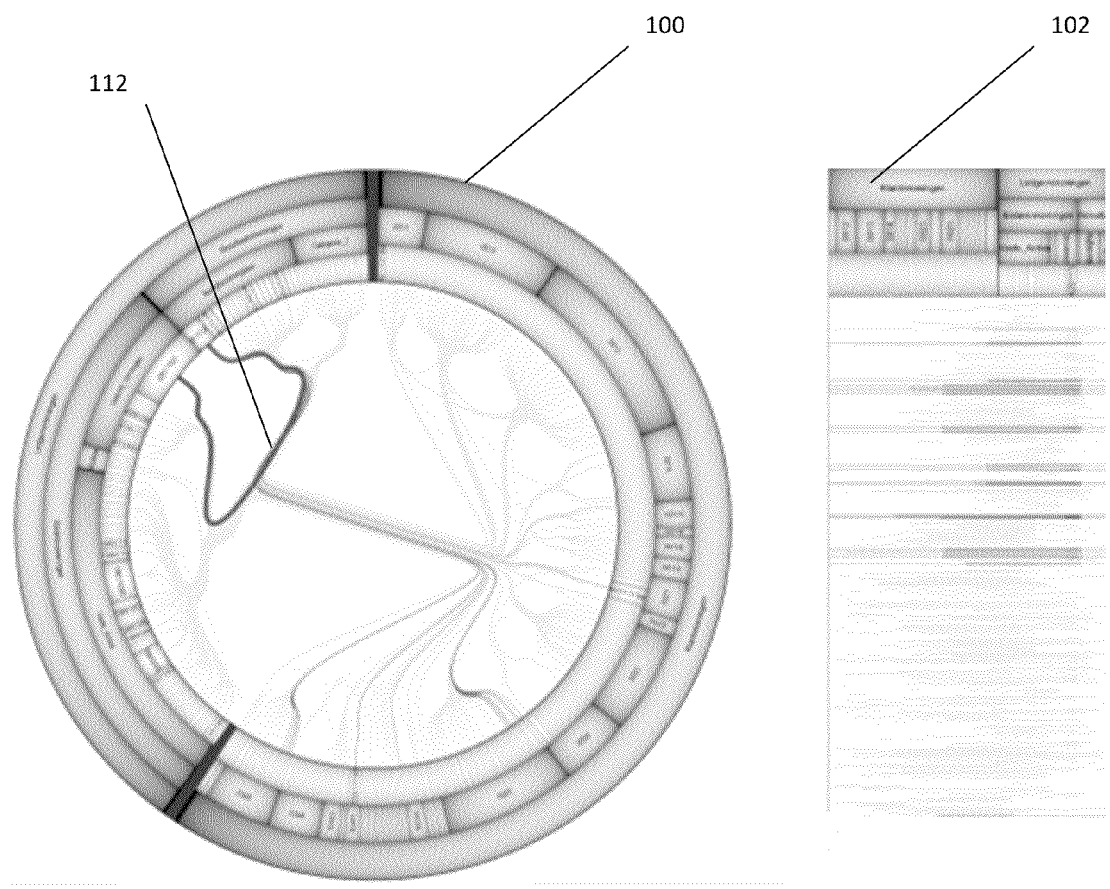

FIG. 13 is an illustration of how the screen would be updated if the first 104 of the blocks 104-110 in FIG. 12 were to be selected for display. This would restrict reduce the numbers of transactions to be illustrated from 8777 to 1499. Reviewing the content of the display shown in FIG. 13 would then reveal in this example that the block consisted mainly of corresponding debit and credit transactions with the greatest numbers of transactions shown by the thickest bundles of lines 112 corresponding transfers between a pair of general ledger accounts which in this data set related to company results and foreign debt.

Figure 14:
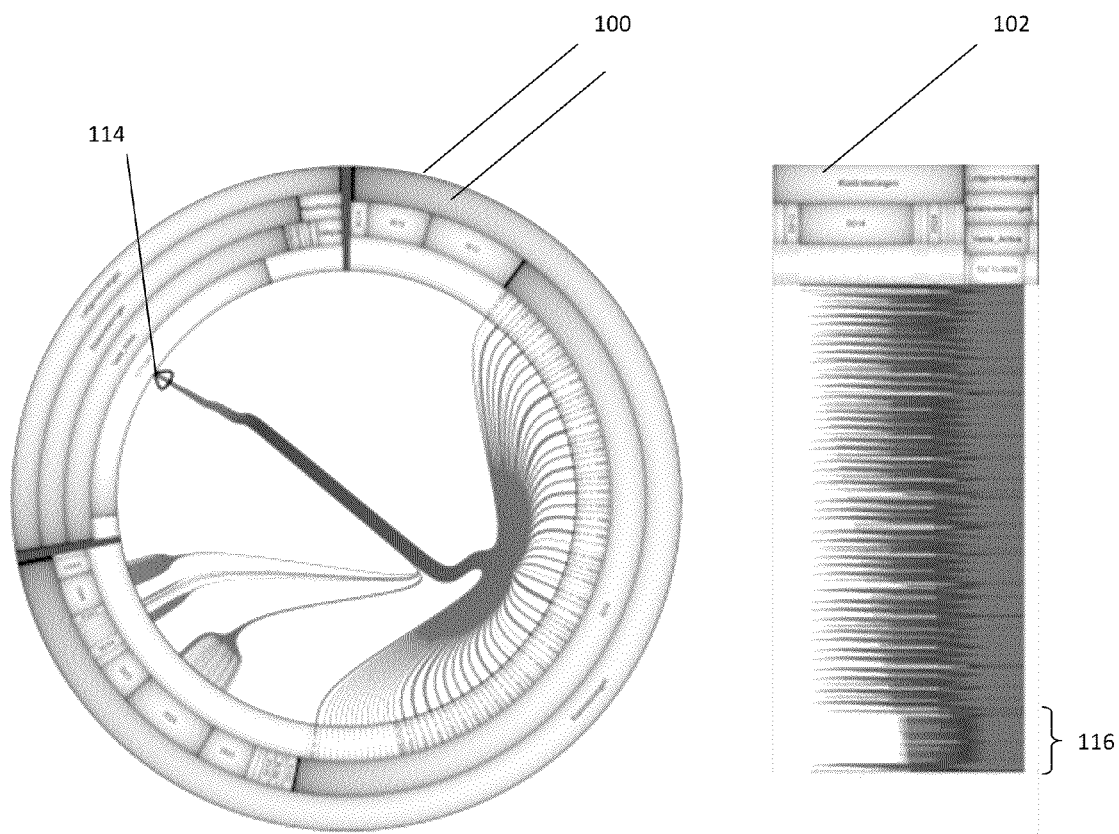

FIG. 14 is an illustration of how the screen would be updated if the second 104 of the blocks 104-110 in FIG. 12 were to be selected for display. This would cause a different set of transactions to be highlighted. In this example the transactions comprise 2766 transactions being paid from the cash account indicated be a common origin for the transactions 114 to a number of individual accounts.

As is shown in FIG. 14, when restricting the rendering of transactions just to transactions in this block, a further subdivision 116 of the transactions becomes apparent in the second 102 section of the display.

Figure 15:
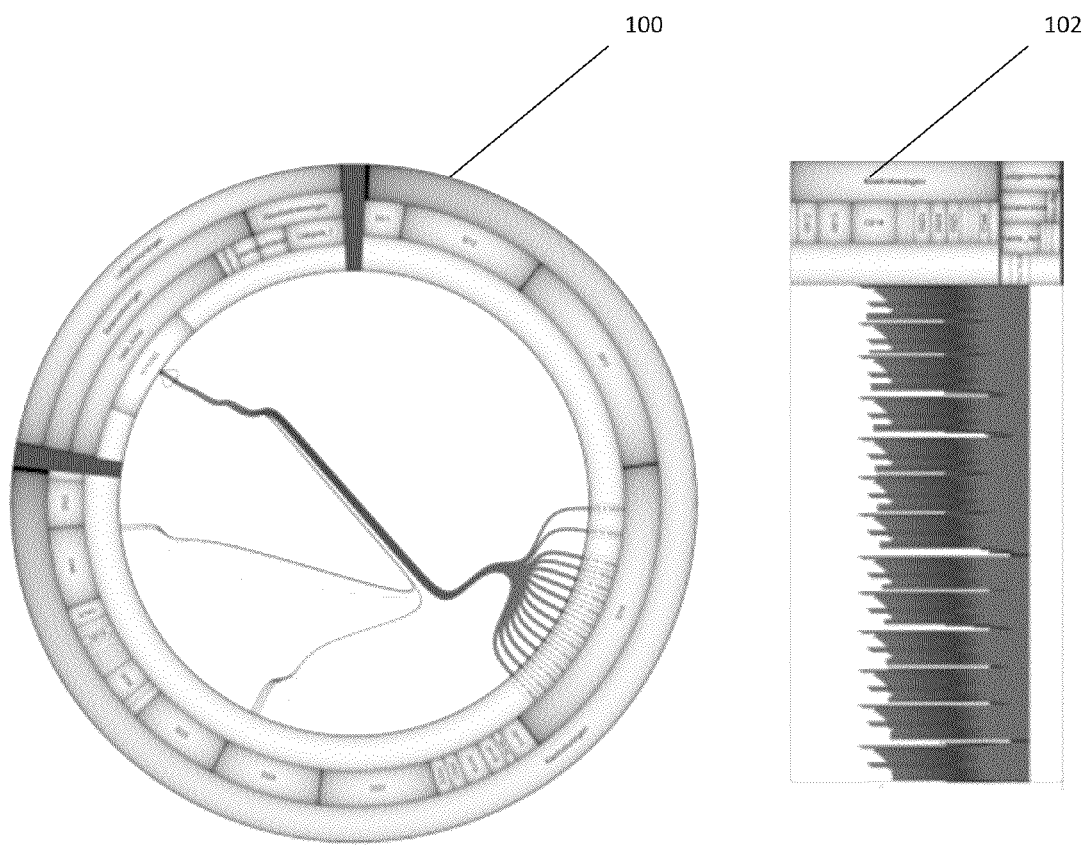

In a similar way this subdivision can be selected and the results displayed. The results of making such a selection are illustrated in FIG. 15

Illustrating account data makes unusual patterns of data more apparent to a user. A number of such unusual patterns are illustrated in FIG. 16.

Figure 16:
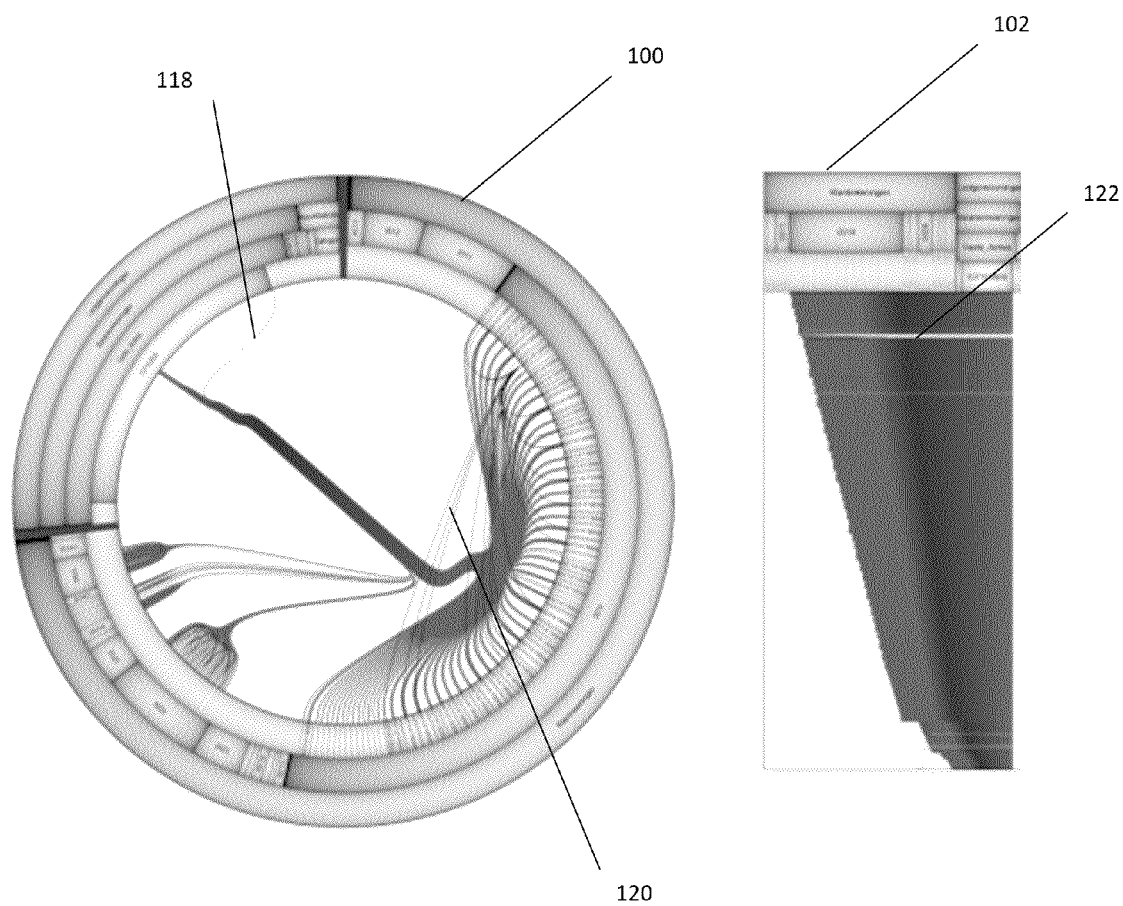

FIG. 16 which is an illustration of the results of restricting the transactions of FIG. 12 to the third block of transactions 108. These transactions comprise transactions being paid into the cash account. However in contrast to FIG. 14 where all the transactions have a common origin, in FIG. 16 one of the transactions 118 is shown as being connected to a different part of the general accounts ledger and a number of the transactions 120 are shown as having both a source and a destination as individual accounts rather than being connected to the general accounts ledger. Additionally in FIG. 16, a group of transactions 122 is apparent in the second section 102 of the screen which might require additional investigation.

Any such transactions may potentially be in error and hence warrant further investigation and to facilitate such investigations, selection of such individual or groups of transactions could cause additional information about such transactions to be displayed.

In addition to selecting groups of transactions for further investigation and other means for selecting subsets of transactions to be viewed could also be provided. A user might be able to select portions of the hierarchy and eliminate them from the transactions being considered. In such an example any transactions relating to the excluded portions of the hierarchy would not be rendered. Additionally, the processing module 11 could be arranged to reassign co-ordinate positions to the remaining portions of the hierarchy to enable the remaining transactions to be better distinguished.

An additional way to facilitate investigation and selection of transactions would be to enable the processing module 11 to be responsive to user input to alter the bundling factor to be utilized to render an image. As shown in FIGS. 8A and 8B varying the bundling factor varies the extent to which transactions sharing higher elements in the hierarchy are grouped together. This would then facilitate on-screen selection of such groups of transactions.

A further way in which the display could be altered would be for the processing module 11 to be responsive to user input to alter the co-ordinates associated with the selected hierarchy. Thus for example instead of associating elements in a hierarchy with positions arranged in a series of concentric circles such as is illustrated in FIG. 6, hierarchy elements could be arranged in a series of lines. Such an arrangement would be particularly suitable when analyzing data where the source and destination data for transactions was to be analyzed against different hierarchies.

Another alternative would be to alter the rules for coloring images to for example color lines based on a time ordering rather than in a manner to distinguish between sources and destinations.

In the previous examples transaction data has been illustrated as being rendered as a set of connections between points arranged around the perimeter of a circle. It will be appreciated that the arrangement of transactions is determined by the assignment of co-ordinates to control points for drawing lines and hence by the assignment of co-ordinates to elements in the hierarchy being used.

Figure 17:
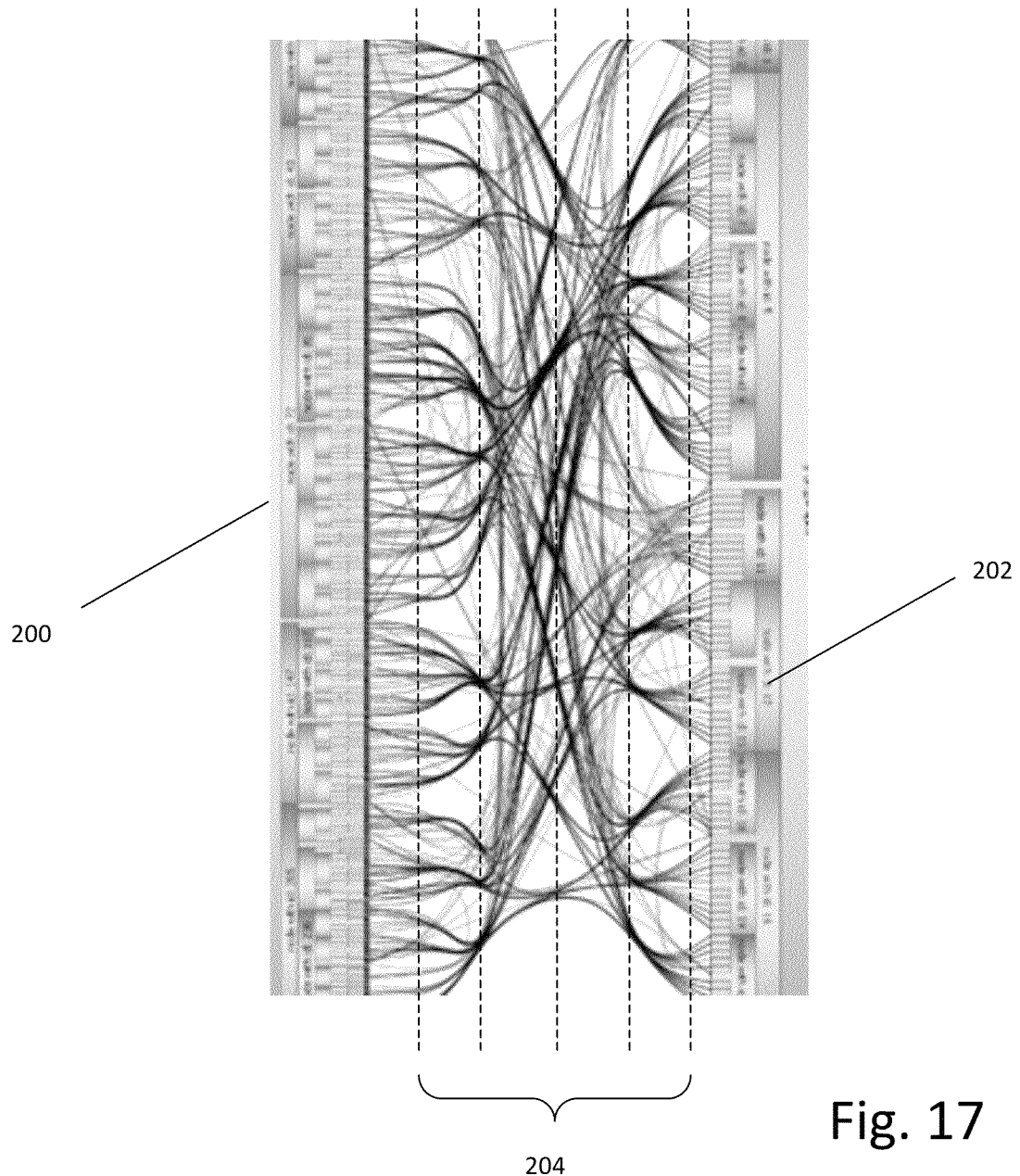

Instead of assigning a set of co-ordinates to elements in a hierarchy arranged in a series of concentric circles, an alternative approach would be to arrange such co-ordinates to lie in a series of straight lines. FIG. 17 is an illustration of a set of transactions rendered using a set of co-ordinates assigned to hierarchy members where such co-ordinates are arranged in a series of straight lines.

In FIG. 17, a separate set of labels 200, 202 is shown identifying a hierarchy for sources and for destinations. Co-ordinates for the elements in the hierarchies are then assigned positions where the co-ordinates lie on one of a set of parallel the lines 204 with elements highest in the hierarchy lying on lines closest to the centre of the set 204 and the leaf nodes are associated with points lying on lines immediately adjacent the labels.

It will be appreciated that illustration of transactions in this way is particularly suitable for illustration of transactions where the hierarchies to be utilized for source and destination elements are different.

Although in the above described a system has been described which facilitates the analysis of credit card data and an example has been illustrated which facilitates the analysis of financial transactions within a company, it will be appreciated that the system could be adapted for the imaging, mapping and analysis of any type of transactional data where transactions can be associated with a source and a destination and the source and destination can be associated with nodes in a hierarchy. Thus for example the described system could be adapted to facilitate the review and interrogation of many types of financial or banking data.

Thus for example wire transfers could be analyzed. In such a system the following information would be available for most transactions:

an originator an originator bank a recipient

Bates number or Swift code transaction date currency type transaction amount transaction type This data could then be supplemented with country or city codes which could be assigned to a transaction based on the information about the originator, recipient or the Bates number or swift code for a transaction. This geographic information could be utilized as the basis of the hierarchy to display the data or alternatively a hierarchy could be constructed based on groups of other attributes either from the above or alternatively derived from the above such as aggregated amounts of money in or out etc. Finally lines representing transactions could be colored to represent information selected from the above or alternatively to differentiate sources and destinations.

A further example of data which would be suitable for analysis would be medical billing data to help facilitate detection of fraud.

Typically medical billing data includes:

multiple medical providers medical claim group of claimants group of facilities

CPT codes

Date Time stamp CPT codes multiple individual groups

Durable Medical Companies

Patients

Patients gender

Patients Age

Medical Clinics

Clinics Open time

Such data could then be analyzed based on hierarchies derived from these to identify unusual patterns in for example repeated CPT codes indicative of identical courses of treatment which could be the result of fraud or alternatively the misuse of CPT codes to facilitate over billing.

Additionally the financial data could be combined with data from other sources to facilitate investigation of transactions. Thus for example where accounts and hence transactions can be associated with individuals, financial transaction data could be supplemented with data identifying other interactions between those individuals such as e-mail messages, text messages, social media transactions or telephone call records.

In the above embodiments transactions are described as being represented as lines where data for representing transactions is rendered to a graphics buffer 14 connected to a display. It will be appreciated that the representation of transactions in such a manner facilitates rapid update of a display 13. More specifically as described transactions are illustrated by a set of primitive elements rendered to a graphics buffer 14. When a subset of transactions is to be displayed instructions to update a display can be limited to an instruction to cause only data for the selected transactions to be utilized to update the display 13. Data for the remaining transactions can, however, still remain within the graphics buffer 14 for use in rendering subsequent displays. Further by causing transactions to be represented in the form of a set of quadrilaterals corresponding to a spliced cubic b-spline, the processing necessary to represent a transaction can be undertaken by a dedicated graphics processor enhancing the speed of the system.

Although in the examples described in detail hierarchies having three levels have been illustrated and discussed, it will be appreciated that in other embodiments hierarchies having greater more levels could be used.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A method by a computer of generating a display, displaying data representing a plurality of financial transactions, the method comprising:

determining, by the computer, a hierarchy having a tree structure wherein leaf nodes in the lowest level of the hierarchy correspond to sources and destinations associated with financial transactions to be represented;

associating, by the computer, elements of the hierarchy with co-ordinates on a display screen; and representing, by the computer, each of the plurality of financial transactions by:

determining for each transaction a first set of control co-ordinates comprising the co-ordinates associated with elements in a path in the tree structure connecting a source and a destination associated with a financial transaction via a closest common parent in the hierarchy common to the source and destination;

determining for each transaction a second set of control co-ordinates for drawing a straight line between co-ordinates associated with the source and destination associated with the financial transaction;

calculating as a set of control co-ordinates for representing a transaction weighted averages of corresponding co-ordinates in the first and second set, weighted by a bundling factor; and representing each of the financial transactions as a line drawn utilizing the calculated control co-ordinates for each transaction.

2. The method of claim 1 wherein determining for each transaction a first set of control co-ordinates comprising the co-ordinates associated with elements in a path in the tree structure connecting the source and destination associated with a financial transaction via the closest common parent in the hierarchy common to the source and destination comprises:
   determining a list of nodes on the tree structure for connecting the source and destination associated with said financial transaction via the closest common parent in the hierarchy common to the source and destination and removing the node corresponding to the closest common parent if the source and destination for the transaction are not both child nodes of a single parent node.

3. The method of claim 1 further comprising appending as control co-ordinates in the set of control co-ordinates for representing a transaction multiple sets of control co-ordinates associated with the source and destination of the transaction to be represented.

4. The method of claim 3 wherein representing each of the financial transaction as a line drawn utilizing the calculated control co-ordinates for each transaction comprises representing each financial transaction as an appended series of b-splines as defined by groups of control co-ordinates in the calculated set.

5. The method of claim 4 wherein representing each financial transaction as an appended series of b-splines comprises:
   determining co-ordinates for a number of points lying on said curve defined by the appended series of b-splines; and
   calculating co-ordinates for a set of quadrilaterals for representing the transaction on the basis of the co-ordinates of the number of points.

6. The method of claim 5 wherein the calculation of the co-ordinates for a set of polygons is to cause points lying on the curve defined by the appended series of b-splines to lie on the midpoints of opposing ends of the quadrilaterals and the other sides of the quadrilaterals are parallel to a line connecting the midpoints of the opposing ends.

7. The method of claim 5 further comprising representing said transactions by coloring said quadrilaterals.

8. The method of claim 7 wherein the coloring of the quadrilaterals is determined based upon a criterion associated with the transaction represented by the quadrilaterals.

9. The method of claim 8 wherein the criterion associated with a transaction comprises a criterion associated with any of: the timing, frequency or amount associated with a transaction.

10. The method of claim 7 wherein coloring of said quadrilaterals varies along the length of the line drawn utilizing the calculated control co-ordinates.

11. The method of claim 1 wherein representing each of the financial transactions as a line drawn utilizing the calculated control co-ordinates for each transaction comprises rendering each of the lines in a graphics buffer and then combining rendered images.

12. The method of claim 11 wherein combining the rendered images comprises:
   determining maximum color values for areas where lines overlap;
   determining color values for rendering lines in a constant color and calculating an alpha blend of the rendered lines; and
   utilizing calculated maximum color values and values of the determined alpha blend of constant color lines to determine the colors to be included in a final display.

13. The method of claim 1 wherein the financial transactions comprise transactions selected from the group comprising: credit card transactions, debit card transactions, banking transactions; and securities trading, insurance, electronic security access data and communications between computers.

14. A data analysis computer system for displaying data facilitating visual analysis of financial transactions, the computer system comprising:
   a transactions database configured to store transaction records defining financial transactions;
   a display screen operable to display representations of financial transactions as lines connecting positions associated with a source and a destination for a financial transaction; and
   a computer processing module configured to
   determine a hierarchy having a tree structure wherein leaf nodes in a lowest level of the hierarchy correspond to sources and destinations associated with financial transactions represented by transaction records stored in the transactions database;
   associate elements of the hierarchy with co-ordinates on said display screen; and
   cause the display screen to show representations of the financial transactions by:
   determining for each transaction a first set of control co-ordinates comprising the co-ordinates associated with elements in a path in the tree structure connecting the source and destination associated with the financial transaction via a closest common parent in the hierarchy common to the source and destination;
   determining for each transaction a second set of control co-ordinates for drawing a straight line between co-ordinates associated with the source and destination associated with the financial transaction;
   calculating as a set of control co-ordinates for representing a transaction weighted averages of corresponding co-ordinates in the first and second set, weighted by a bundling factor; and
   representing each of the financial transactions as a line drawn utilizing the calculated control co-ordinates for each transaction.

15. A non-transitory computer readable medium storing computer implementable instructions which when implemented by a programmable computer cause the computer to:
   determine a hierarchy having a tree structure wherein leaf nodes in a lowest level of a hierarchy corresponds to sources and destinations associated with financial transactions to be represented;
   associate elements of the hierarchy with co-ordinates on a display screen; and
   represent each of the plurality of financial transactions by:
   determine for each transaction a first set of control co-ordinates comprising co-ordinates associated with elements in a path in the tree structure connecting a source and destination associated with said financial transaction via a closest common parent in a hierarchy common to the source and destination;
   determine for each transaction a second set of control co-ordinates for drawing a straight line between co-ordinates associated with the source and destination associated with the financial transaction;
   calculate as a set of control co-ordinates for representing a transaction weighted averages of corresponding co-ordinates in the first and second set, weighted by a bundling factor; and
   represent each of the financial transactions as a line drawn utilizing the calculated control co-ordinates for each transaction.

* * * * *